(12) United States Patent
Ross et al.

(10) Patent No.: US 11,888,324 B2
(45) Date of Patent: Jan. 30, 2024

(54) POWER MANAGEMENT APPARATUS FOR ENERGY HARVESTING

(71) Applicant: Trameto Limited, Swansea (GB)

(72) Inventors: Mark Ross, San Carlos, CA (US); Laurence Alan Strong, Bristol (GB); Robert Robertson, Bristol (GB)

(73) Assignee: Trameto Limited, Chepstow (GB)

( * ) Notice: Subject to any disclaimer, the term of this patent is extended or adjusted under 35 U.S.C. 154(b) by 0 days.

(21) Appl. No.: 17/718,327

(22) Filed: Apr. 12, 2022

(65) Prior Publication Data
US 2023/0327482 A1    Oct. 12, 2023

(51) Int. Cl.
| | |
|---|---|
| H02J 50/00 | (2016.01) |
| H02J 50/10 | (2016.01) |
| H02J 7/00 | (2006.01) |
| H02J 7/34 | (2006.01) |

(52) U.S. Cl.
CPC ...... *H02J 50/001* (2020.01); *H02J 7/007184* (2020.01); *H02J 7/345* (2013.01); *H02J 50/10* (2016.02); *H02J 2207/50* (2020.01)

(58) Field of Classification Search
CPC .............. H02J 50/001; H02J 50/10; H02J 7/00
See application file for complete search history.

(56) References Cited

U.S. PATENT DOCUMENTS

| | | | | |
|---|---|---|---|---|
| 2009/0127976 A1* | 5/2009 | Ward | ..................... | H02P 25/034 700/47 |
| 2011/0260536 A1* | 10/2011 | Roy | .......................... | H02J 3/32 307/46 |
| 2014/0159667 A1* | 6/2014 | Kim | ...................... | H02J 50/001 323/299 |
| 2014/0210423 A1* | 7/2014 | Goto | ...................... | H02N 2/188 320/139 |
| 2015/0066233 A1* | 3/2015 | Kang | ........................ | G06F 1/04 700/298 |
| 2016/0211742 A1* | 7/2016 | Mohammad | ............ | H02J 50/00 |
| 2016/0301257 A1* | 10/2016 | Parks | ...................... | H02J 50/20 |

(Continued)

*Primary Examiner* — Rexford N Barnie
*Assistant Examiner* — Joseph N Inge
(74) *Attorney, Agent, or Firm* — Winstead PC

(57) ABSTRACT

A power management apparatus 20 comprises: a plurality of energy harvesting input channels 21-24; a first energy storage element connection for connecting to an energy storage element 32; an inductor connection 27; and a switching circuit 28. A controller 30 operates the switching circuit to transfer energy between the energy harvesting input channels 21-24 and the first energy storage element connection 25 by a sequence of energy transfer cycles. Each energy harvesting input channel 21-24 is allocated a plurality of the energy transfer cycles. The controller 30 determines operating parameters for operating the switching circuit 28 which transfer a maximum power from the electrical energy harvesting source connected to the energy harvesting input channel and a maximum power inductor utilisation factor. The controller 30 determines a set of adjusted operating parameters for sharing use of the inductor between the plurality of energy harvesting input channels 21-24. An energy harvesting input channel 21-24 is selected for adjustment based on an effect of a change in the inductor utilisation factor and a corresponding change in power of the energy harvesting input channel.

36 Claims, 12 Drawing Sheets

(56) References Cited

U.S. PATENT DOCUMENTS

| | | |
|---|---|---|
| 2017/0187187 A1 | 6/2017 | Amin et al. |
| 2019/0115783 A1* | 4/2019 | Bracco ................ H02M 3/156 |
| 2019/0181688 A1* | 6/2019 | Su ....................... H04B 5/0037 |
| 2020/0076240 A1* | 3/2020 | Papadopoulos .......... H04Q 9/00 |
| 2020/0117259 A1* | 4/2020 | Kita ......................... G06F 1/28 |

* cited by examiner

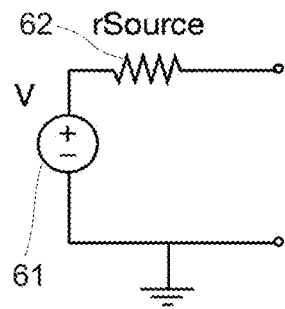
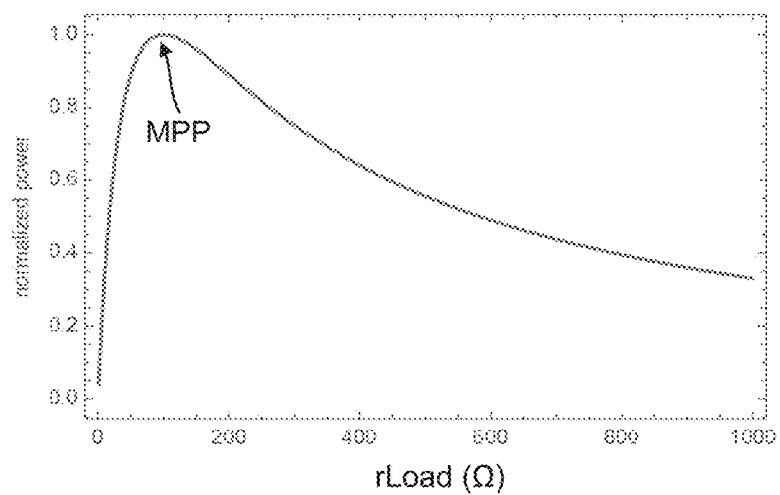
FIG. 10
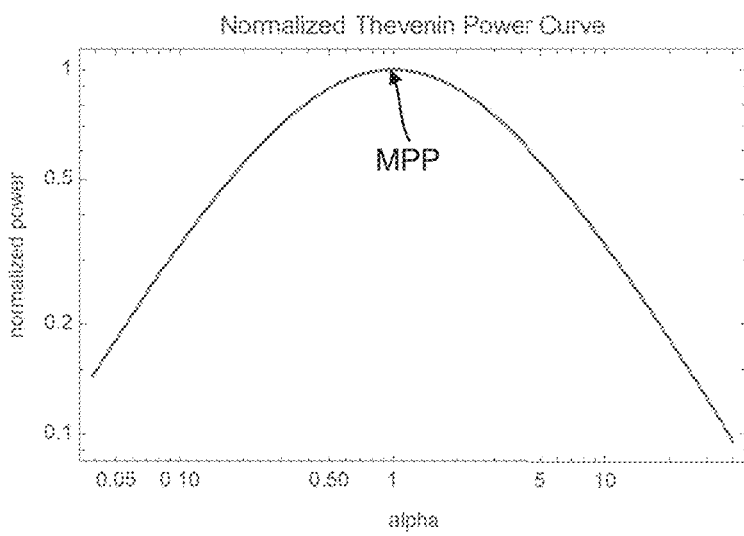
| alpha | power fraction |
|---|---|
| 1/8 | 32/81 |
| 1/4 | 16/25 |
| 1/2 | 8/9 |
| 1 | 1 |
| 2 | 8/9 |
| 4 | 16/25 |
| 8 | 32/81 |
FIG. 11

| | channel | start utilization | start power | type | adjustedUtilization | adjustedPower |
|---|---|---|---|---|---|---|
| 1 | 1 | 0.426673 | 52 | Thevenin | 7/8 | 224/225 |
| | 2 | 0.205374 | 49 | Thevenin | 1 | 1 |
| | 3 | 0.268607 | 24 | PV | 1 | 1 |
| | 4 | 0.250641 | 45 | Thevenin | 1 | 1 |
| 2 | 1 | 0.426673 | 52 | Thevenin | 7/8 | 0.995556 |
| | 2 | 0.205374 | 49 | Thevenin | 1 | 1 |
| | 3 | 0.268607 | 24 | PV | 1 | 1 |
| | 4 | 0.250641 | 45 | Thevenin | 7/8 | 224/225 |
| 3 | 1 | 0.426673 | 52 | Thevenin | 7/8 | 0.995556 |
| | 2 | 0.205374 | 49 | Thevenin | 7/8 | 224/225 |
| | 3 | 0.268607 | 24 | PV | 1 | 1 |
| | 4 | 0.250641 | 45 | Thevenin | 7/8 | 0.995556 |
| 4 | 1 | 0.426673 | 52 | Thevenin | 7/8 | 45/49 |
| | 2 | 0.205374 | 49 | Thevenin | 7/8 | 0.995556 |
| | 3 | 0.268607 | 24 | PV | 1 | 1 |
| | 4 | 0.250641 | 45 | Thevenin | 7/8 | 0.995556 |

FIG. 14

| channel | startUtilization | startPower | type | utilizationAdjust algo | powerAdjust algo |
|---|---|---|---|---|---|
| 1.0 | 0.426673 | 52.0 | Thevenin | 0.5 | 0.888889 |
| 2.0 | 0.205374 | 49.0 | Thevenin | 0.625 | 0.946746 |
| 3.0 | 0.268607 | 24.0 | PV | 1.0 | 1.0 |
| 4.0 | 0.250641 | 45.0 | Thevenin | 0.5 | 0.888889 |
| target | 0.760258 | | | | |
| total | | | | 0.735623 | 156.613 |
| ratio (%) | | | | | 98.6216 |

FIG. 15

POWER MANAGEMENT APPARATUS FOR ENERGY HARVESTING

BACKGROUND OF THE INVENTION

Energy harvesting generates usable electrical energy from energy sources in the environment. Energy can be harvested from sources such as ambient light, movement and thermal energy. The electrical energy is typically stored and then used to power electrical loads, such as electronic devices.

Examples of energy harvesting transducers are: a photovoltaic (PV) cell which generates an electrical output in response to light; a thermoelectric generator (TEG) which generates an electrical output in response to a temperature difference; a piezoelectric transducer which generates an electrical output in response to mechanical strain across the transducer; and an electrodynamic transducer which generates an electrical output in response to vibrations. The electrical energy from transducers can be stored in any suitable storage device.

A power management unit (PMU) or power management integrated circuit (PMIC) may connect to multiple energy harvesting transducers to increase the amount of harvested energy. The PMU may connect to energy harvesting transducers of the same type (e.g. a plurality of PV cells) or the PMU may connect to energy harvesting transducers of different types (e.g. a PV cell and a TEG). The outputs of the various types of energy harvesting transducers have a wide range of different electrical characteristics. For example, the electrical outputs of energy harvesting transducers can have voltages which range from tens of millivolts (mV) to tens of Volts, and currents which range from microamps (μA) to milliamps (mA). The electrical output can be steady or bursty, and can be direct current (DC) or alternating current (AC). Also, the amount of harvested energy can vary according to ambient conditions. For example, the output of PV cells varies according to illumination level. This range of electrical characteristics and variation in energy outputs presents challenges when attempting to provide a PMU which connects to multiple energy harvesting sources.

SUMMARY OF THE INVENTION

Aspects of the present invention provide a power management apparatus, a power management system, a controller, a method and a computer program according to the appended claims.

An aspect provides a power management apparatus comprising:
  a plurality of energy harvesting input channels each for connecting to an electrical energy harvesting source;
  a first energy storage element connection for connecting to an energy storage element;
  an inductor connection for connecting to an inductor;
  a switching circuit which is configured to selectively connect to the energy harvesting input channels, the inductor connection and the first energy storage element connection; and
  a controller which is configured to:
  operate the switching circuit to transfer energy between the energy harvesting input channels and the first energy storage element connection by a sequence of energy transfer cycles, each of the energy transfer cycles comprising:
  an energise phase in which energy is transferred from one of the plurality of energy harvesting input channels to the inductor connection for an energise time ($tE$) to transfer energy to the inductor and;
  a de-energise phase in which energy is transferred from the inductor connection to the first energy storage element connection for a de-energise time ($tD$),
  wherein each energy harvesting input channel is allocated a plurality of the energy transfer cycles, with a harvesting cycle period ($tP$) between start times of successive energy transfer cycles, and the plurality of energy harvesting input channels are connected to the inductor connection in a time-multiplexed manner;
  determine operating parameters for operating the switching circuit by:
  determining, for each of the energy harvesting input channels, maximum power operating parameters which transfer a maximum power from the electrical energy harvesting source connected to the energy harvesting input channel and a maximum power inductor utilisation factor representing a portion of time for which the inductor is required by that input channel to transfer the maximum power; and
  determining a set of adjusted operating parameters for sharing use of the inductor between the plurality of energy harvesting input channels in the time-multiplexed manner, wherein at least one of the energy harvesting input channels is selected for an adjustment of the operating parameters from the maximum power operating parameters, the selection based on an effect of a change in the inductor utilisation factor and a corresponding change in power of the energy harvesting input channel.

Optionally, the controller is configured to determine the set of adjusted operating parameters ($tE$, $tP$) by:
  determining an adjustment metric for each energy harvesting input channel to give a set of candidate adjustment metric values, where each adjustment metric value is indicative of a change in inductor utilisation factor and a corresponding change in power;
  selecting one of the energy harvesting input channels for adjustment based on the set of candidate adjustment metric values; and
  adjusting the operating parameters ($tE$, $tP$) for the selected energy harvesting input channel.

Optionally, each candidate adjustment metric value is a ratio of a change in inductor utilisation factor to a change in power, and wherein selecting one of the energy harvesting input channels for adjustment comprises selecting the input channel associated with the adjustment metric having a largest value; or each candidate adjustment metric value is a ratio of a change in power to a change in inductor utilisation factor, and wherein selecting one of the energy harvesting input channels for adjustment comprises selecting the energy harvesting input channel associated with the adjustment metric having a smallest value.

Optionally, the controller is configured to determine the set of operating parameters by:
  determining a type of electrical energy harvesting source connected to each of the energy harvesting input channels; and
  using the determined type of electrical energy harvesting source in determining the set of adjusted operating parameters.

Optionally, the corresponding change in power is based on the determined type of electrical energy harvesting source.

Optionally, a step size of the change in the inductor utilisation factor is based on the determined type of electrical energy harvesting source.

Optionally, the controller uses a set of pre-computed or stored values to determine the set of adjusted operating parameters.

Optionally, the type is at least one of: Thevenin source, photovoltaic source, thermo-electric generator and alternating current source.

Optionally, the operating parameters for each of the plurality of channels comprise an energise time (tE) and a harvesting cycle period (tP) and the controller is configured to determine the set of adjusted operating parameters by one of:
  maintaining tE as a constant value and adjusting tP;
  maintaining tP as a constant value and adjusting tE.

Optionally, the controller is configured to determine, for at least one of the input channels, a different value of at least one of the maximum power operating parameters to achieve a reduced inductor utilisation factor for that energy harvesting input channel before determining the set of adjusted operating parameters.

Optionally, the controller is configured to:
  determine a maximum inductor utilisation factor representing a total amount of time for which the inductor can be used to transfer energy between the energy harvesting input channels and the energy storage element;
  determine a sum of the inductor utilisation factors for the plurality of energy harvesting input channels;
  compare the sum of the inductor utilisation factors with the maximum inductor utilisation factor; and
  if the sum of the inductor utilisation factors is greater than the maximum inductor utilisation factor, determine the set of adjusted operating parameters (tE, tP) such that a sum of adjusted inductor utilisation factors is less than the maximum inductor utilisation factor.

Optionally, the controller is configured to determine the set of adjusted operating parameters (tE, tP) for the switching circuit by an iterative process which uses an incremental change in inductor utilisation factor at each iteration.

Optionally, the power management apparatus comprises a load output, the switching circuit is configured to selectively connect to the load output and the controller is also configured to operate the switching circuit to transfer energy from the first energy storage element connection to the load output via the inductor connection.

Optionally, the power management apparatus is configured to determine the maximum inductor utilisation factor based on inductor time required to transfer energy from the energy storage element to the load output via the inductor connection.

Optionally, the controller is configured to operate the switching circuit to transfer energy from the first energy storage element connection to the load output by a plurality of transfer cycles, each transfer cycle comprising:
  an energise phase in which energy is transferred from the first energy storage element connection to the inductor connection for an energise time (tE) to transfer energy to the inductor and;
  a de-energise phase in which energy is transferred from the inductor connection to the load output for a de-energise time (tD).

Optionally, the inductor utilisation factor for an input channel is represented by:

$$\text{Utilisation} = \frac{tE + tD}{tP}$$

where: tE is a duration of the energise phase,
tD is a duration of the de-energise phase,
tP is the harvesting cycle period.

Optionally, the controller is configured, during operation with the set of adjusted operating parameters, to:
  determine if each of the energy harvesting input channels is operating substantially at a maximum power point; and
  if one or more of the energy harvesting input channels is no longer operating substantially at a maximum power point, determining new maximum power operating parameters for the one or more of the energy harvesting input channels.

Optionally, if one or more of the energy harvesting input channels is no longer operating substantially at a maximum power point, the controller is configured to determine a new set of adjusted operating parameters using the new maximum power operating parameters.

Optionally, the controller is configured to determine a further set of adjusted operating parameters based on at least one of:
  a change in state of an energy harvesting input channel;
  a voltage of the energy storage element;
  a change in voltage of the energy storage element since the determination of an existing set of adjusted operating parameters;
  a predetermined time period elapsing since the determination of a set of adjusted operating parameters;
  a start of a new period in which energy is not transferred to the load;
  a change in inductor usage requirements.

Another aspect provides a power management system comprising:
  a power management apparatus;
  an inductor connected to the inductor connection of the power management apparatus;
  a first energy store connected to the first energy storage element connection of the power management apparatus.

Another aspect provides a method of controlling a power management apparatus, the power management apparatus comprising an inductor connection for connecting to an inductor, a plurality of energy harvesting input channels each for connecting to an electrical energy harvesting source, a first energy storage element connection for connecting to an energy storage element and a switching circuit, the method comprising:
  operating the switching circuit to transfer energy between the energy harvesting input channels and the first energy storage element connection by a sequence of energy transfer cycles, each of the energy transfer cycles comprising:
  an energise phase in which energy is transferred from one of the plurality of energy harvesting input channels to the inductor connection for an energise time (tE) to transfer energy to the inductor and;
  a de-energise phase in which energy is transferred from the inductor connection to the first energy storage element connection for a de-energise time (tD),
  wherein each energy harvesting input channel is allocated a plurality of the energy transfer cycles, with a harvesting cycle period (tP) between start times of successive energy transfer cycles, and the plurality of energy harvesting input channels are connected to the inductor connection in a time-multiplexed manner;

determining operating parameters for operating the switching circuit by:

determining, for each of the energy harvesting input channels, maximum power operating parameters which transfer a maximum power from the electrical energy harvesting source connected to the energy harvesting input channel and a maximum power inductor utilisation factor representing a portion of time for which the inductor is required by that input channel to transfer the maximum power; and determining a set of adjusted operating parameters for sharing use of the inductor between the plurality of energy harvesting input channels in the time-multiplexed manner, wherein at least one of the energy harvesting input channels is selected for an adjustment of the operating parameters from the maximum power operating parameters, the selection based on an effect of a change in the inductor utilisation factor and a corresponding change in power of the energy harvesting input channel.

Optionally, determining the set of adjusted operating parameters comprises:

determining an adjustment metric for each energy harvesting input channel to give a set of candidate adjustment metric values, where each adjustment metric value is indicative of a change in inductor utilisation factor and a corresponding change in power;

selecting one of the energy harvesting input channels for adjustment based on the set of candidate adjustment metric values; and adjusting the operating parameters (tE, tP) for the selected energy harvesting input channel.

Optionally, each candidate adjustment metric value is a ratio of a change in inductor utilisation factor to a change in power, and wherein selecting one of the energy harvesting input channels for adjustment comprises selecting the input channel associated with the adjustment metric having a largest value; or each candidate adjustment metric value is a ratio of a change in power to a change in inductor utilisation factor, and wherein selecting one of the energy harvesting input channels for adjustment comprises selecting the energy harvesting input channel associated with the adjustment metric having a smallest value.

Optionally, determining the set of operating parameters comprises:

determining a type of electrical energy harvesting source connected to each of the energy harvesting input channels; and using the determined type of electrical energy harvesting source in determining the set of adjusted operating parameters.

Optionally, the corresponding change in power is based on the determined type of electrical energy harvesting source.

Optionally, a step size of the change in the inductor utilisation factor is based on the determined type of electrical energy harvesting source.

Optionally, the operating parameters for each of the plurality of channels comprise an energise time (tE) and a harvesting cycle period (tP) and the method comprises determining the set of adjusted operating parameters by one of:

maintaining tE as a constant value and adjusting tP;
maintaining tP as a constant value and adjusting tE.

Optionally, the method comprises determining, for at least one of the input channels, a different value of at least one of the maximum power operating parameters to achieve a reduced inductor utilisation factor for that energy harvesting input channel before determining the set of adjusted operating parameters.

Optionally, the method comprises:

determining a maximum inductor utilisation factor representing a total amount of time for which the inductor can be used to transfer energy between the energy harvesting input channels and the energy storage element;

determining a sum of the inductor utilisation factors for the plurality of energy harvesting input channels;

comparing the sum of the inductor utilisation factors with the maximum inductor utilisation factor; and if the sum of the inductor utilisation factors is greater than the maximum inductor utilisation factor, determine the set of adjusted operating parameters (tE, tP) such that a sum of adjusted inductor utilisation factors is less than the maximum inductor utilisation factor.

Optionally, the method comprises determining the set of adjusted operating parameters (tE, tP) for the switching circuit by an iterative process which uses an incremental change in inductor utilisation factor at each iteration.

Optionally, the power management apparatus comprises a load output, the switching circuit is configured to selectively connect to the load output and the method comprises operating the switching circuit to transfer energy from the first energy storage element connection to the load output via the inductor connection.

Optionally, the method comprises determining the maximum inductor utilisation factor based on inductor time required to transfer energy from the energy storage element to the load output via the inductor connection.

Optionally, the method comprises operating the switching circuit to transfer energy from the first energy storage element connection to the load output by a plurality of transfer cycles, each transfer cycle comprising:

an energise phase in which energy is transferred from the first energy storage element connection to the inductor connection for an energise time (tE) to transfer energy to the inductor and;

a de-energise phase in which energy is transferred from the inductor connection to the load output for a de-energise time (tD).

Optionally, the method comprises, during operation with the set of adjusted operating parameters:

determining if each of the energy harvesting input channels is operating substantially at a maximum power point; and if one or more of the energy harvesting input channels is no longer operating substantially at a maximum power point, determining new maximum power operating parameters for the one or more of the energy harvesting input channels.

Optionally, if one or more of the energy harvesting input channels is no longer operating substantially at a maximum power point, the method comprises determining a new set of adjusted operating parameters using the new maximum power operating parameters.

Optionally, the method comprises determining a further set of adjusted operating parameters based on at least one of:

a change in state of an energy harvesting input channel;
a voltage of the energy storage element;
a change in voltage of the energy storage element since the determination of an existing set of adjusted operating parameters;

a predetermined time period elapsing since the determination of a set of adjusted operating parameters;

a start of a new period in which energy is not transferred to the load;

a change in inductor usage requirements.

Another aspect provides a controller for a power management apparatus which is configured to perform the method as disclosed or claimed.

Another aspect provides a computer program comprising instructions which, when the program is executed by a computer, cause the computer to carry out the method as disclosed or claimed. Another aspect provides a computer-readable medium having the computer program stored on it. The functionality described in this document can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

An advantage of at least one example of the present invention is that energy is more efficiently harvested from a plurality of energy harvesting sources. By selecting a channel for adjustment in the manner described, it is possible to maximise overall energy/power transfer from the energy harvesting input channels while sharing use of the inductor between the plurality of energy harvesting input channels.

BRIEF DESCRIPTION OF THE DRAWINGS

FIG. 10 shows a model representation of a Thevenin source and a power curve for a Thevenin source;

FIG. 11 shows a normalised power curve for a Thevenin source;

FIG. 14 shows part of a worked example of determining a set of adjusted operating parameters;

FIG. 15 shows a final result of the worked example of FIG. 14;

DETAILED DESCRIPTION

Figure 1:
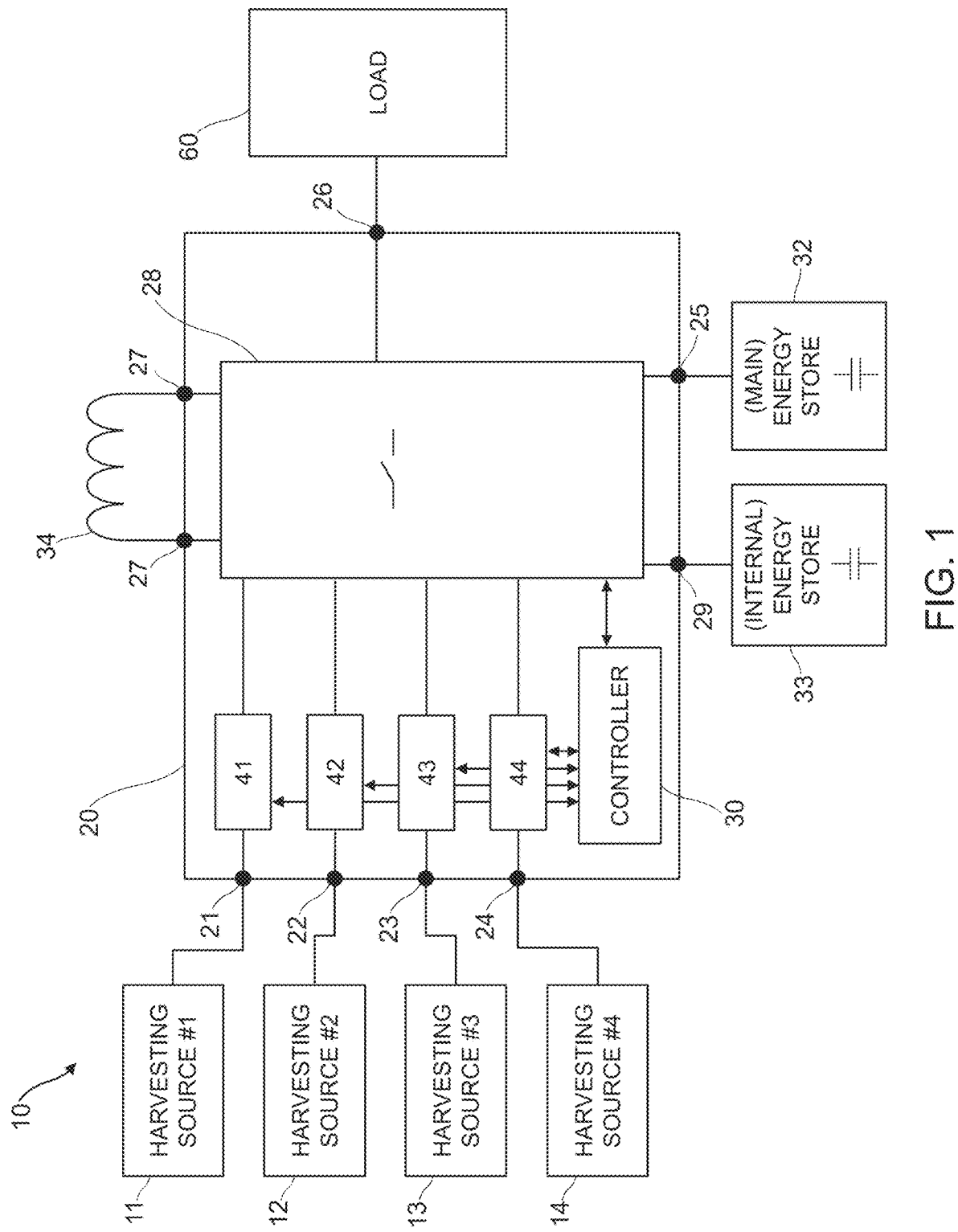
FIG. 1 shows an energy harvesting system including a power management apparatus.

FIG. 1 shows an energy harvesting system 10 comprising a power management apparatus 20. Other names for the power management apparatus are a power management unit (PMU) or a power management integrated circuit (PMIC). The power management apparatus 20 has a plurality of energy harvesting inputs or energy harvesting input channels 21-24. In this example there are four input channels but the number of input channels can be any suitable number. Each of the input channels 21-24 can connect to an energy harvesting source or an energy harvesting transducer 11-14. Examples of energy harvesting sources are: a photovoltaic (PV) cell which generates an electrical output in response to light; a thermoelectric generator (TEG) which generates an electrical output in response to a temperature difference; a piezoelectric transducer which generates an electrical output in response to mechanical strain across the transducer; and an electrodynamic transducer which generates an electrical output in response to vibrations.

The input channels 21-24 may connect to different types of energy harvesting sources. One of the input channels 21-24 may connect to a type of energy harvesting source which is different to a type of energy harvesting source connected to another one of the input channels 21-24. For example, the input channels 21-24 may be connected to: (i) four PV sources; (ii) two PV sources and two TEG sources; (iii) one PV source, one TEG source and one piezo source. Each input channel 21-24 may receive electrical energy with a current in the range, for example, of 1 µA to 100 mA and a voltage in the range 20 mV to 20 V. Each input channel 21-24 may receive electrical energy which is direct current (DC) or alternating current (AC). An impedance of the energy harvesting source 11-14 may be in the range, for example, from single-digit ohms to tens of thousands of ohms.

The power management apparatus 20 comprises an output 25 for connecting to an energy store 32. This will be called a main energy store as it is the main store of energy which is used to power a load and internal circuitry. The main energy store 32 may be provided on a same printed circuit board as the power management apparatus 20, or may be separate to the power management apparatus. Examples of devices suitable for use as the main energy store are: a capacitor, a super capacitor, a battery. The power management apparatus 20 may connect to a plurality of main energy stores. These may be of the same type, or different types (e.g. super-capacitor and battery).

Optionally, the power management apparatus 20 comprises an output 29 for connecting to another energy store 33. This further energy store will be called an internal energy store as the function is to store energy to power operation of the power management apparatus. The internal energy store 33 will typically be provided on a same printed circuit board as the power management apparatus 20. Examples of devices suitable for use as the internal energy store are: a capacitor, a super capacitor, a battery.

The power management apparatus 20 has an output 26 for connecting to a load 60. The load 60 can be any device requiring an electrical supply. There is a capacitor (not shown) between the output 26 and the load. Example loads are wireless devices which perform a sensing function (e.g. temperature sensing) and wirelessly report a measurement; Internet of Things (IoT) devices; home automation devices; asset tracking devices.

The power management apparatus 20 comprises an inductor connection 27 for connecting to an inductor 34. The inductor connection may comprise a pair of terminals or other electrical connection for electrically connecting to first and second ends of the inductor 34. The inductor 34 comprises a magnetic core and a coil. The power management apparatus 20 comprises a switching circuit 28 which can selectively connect the inputs 21-24 to the inductor 34. The switching circuit 28 can also selectively connect the inductor 34 to the energy store 32 via the output 25 and to the energy store 33 via the output 29. The switching circuit 28 can also selectively connect the inductor 34 to a load 60 via the output 26. A controller 30 controls operation of the switching circuit 28. A plurality of loads 60 may be connected to the load output 26.

The power management apparatus 20 comprises a plurality of input stages 41-44. Each of the input stages 41-44 connects to a respective input channel 21-24. The input stages 41-44 in cooperation with the controller 30 can determine whether an input signal is a DC signal or an AC signal. The input stages 41-44 can provide negative voltage conversion functionality to AC signals. This converts negative polarity portions of an AC signal to a signal which has positive polarity.

Figure 2:
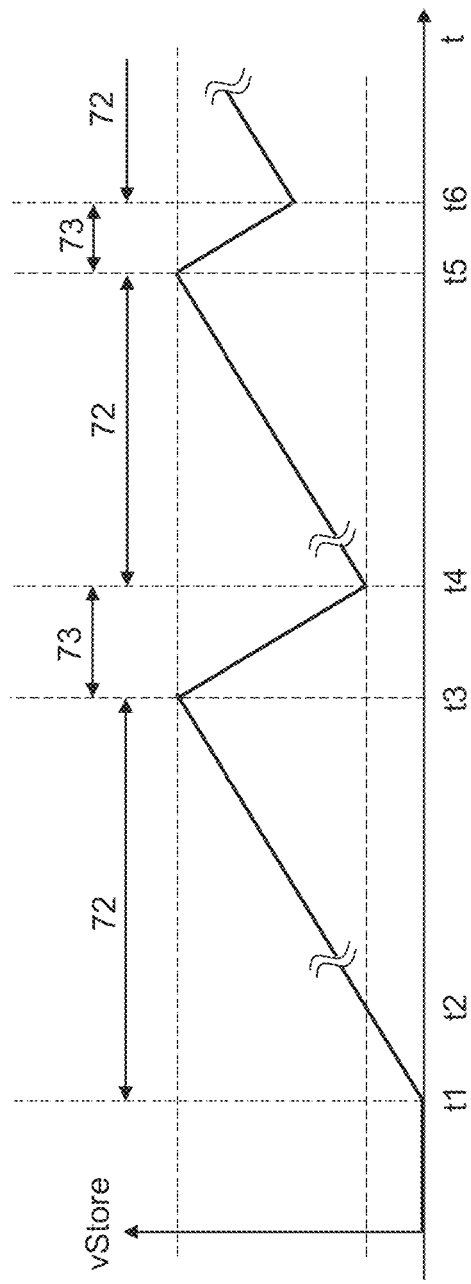
FIG. 2 shows an example time line of operating the power management apparatus.

FIG. 2 shows an example time line of operating the power management apparatus 20. In this example, the time line comprises periods 73 when the power management apparatus transfers energy to a load and periods 72 when the power management apparatus does not transfer energy to the load. At time t1 the first period 72 begins. Between times t1 and t3 the power management apparatus 20 harvests energy by transferring electrical energy received via inputs 21-24 to the main energy store 32. The power management apparatus does not power the load during this time. The power management apparatus may also transfer electrical energy between the main energy store 32 and the internal energy store 33. At time t3 the energy store 32 is full. Between times t3 and t4 the power management apparatus 20 transfers electrical energy from the main energy store 32 to the output 26 for powering the load 60. The voltage vStore falls as the energy store empties. The power management apparatus operates as a DC-to-DC converter, converting electrical energy from the main energy store to an output voltage required by the load 60. During period 73 the power management apparatus may also transfer electrical energy received via inputs 21-24 to the main energy store 32, similar to period 72. During period 73, the power management apparatus may also transfer electrical energy between the main energy store 32 and the internal energy store 33. During each of the periods 73 the power management apparatus may service the various demands on inductor time (powering the load, transfer main store-to-internal store, input channel-to-main store) on a priority basis.

At time t4 the voltage level of vStore reaches a predefined threshold and the power management apparatus stops powering the load. Between times t4 and t5 the power management apparatus 20 operates in another period 72 in which it harvests energy and does not power the load. At time t5 the power management apparatus 20 begins another period 73 in which it powers the load. On this occasion, period 73 ends at time t6 after a shorter duration (compared to time t3 to t4) and the voltage vStore has not fallen to the threshold value. At time t6 the power management apparatus 20 begins another period in which it harvests energy and does not power the load. In general, periods 73 can last for a varying length of time. The length of time can depend on power demands of the load. The voltage vStore at the end of the load powering mode can fall within a range of values.

During an initial period between t1 and t2 the power management apparatus 20 can transfer electrical energy received via inputs 21-24 to the internal energy store 31 and the main energy store 32 to ensure that the internal energy store is adequately charged.

The energy harvesting sources 21-24 connected to the inputs 21-24 can be of the same type, or different types. For energy harvesting sources of different types, the voltage and current can differ between the energy harvesting source types. The electrical signal can be direct current (DC) or alternating current (AC). A piezoelectric transducer is an example of an energy harvesting source which produces an AC output. A further variable is that the energy contributed by each of the energy harvesting sources can vary over time.

The power management apparatus operates in a time-multiplexed manner, connecting to one of the input channels at a time. The inductor 34 is a resource which is shared between the input channels 21-24. The inductor 34 can only be connected to one of the input channels 21-24 at a time.

The controller 30 operates the power management apparatus 20 so as to maximise an amount of energy harvested from the inputs 21-24.

Figure 3:
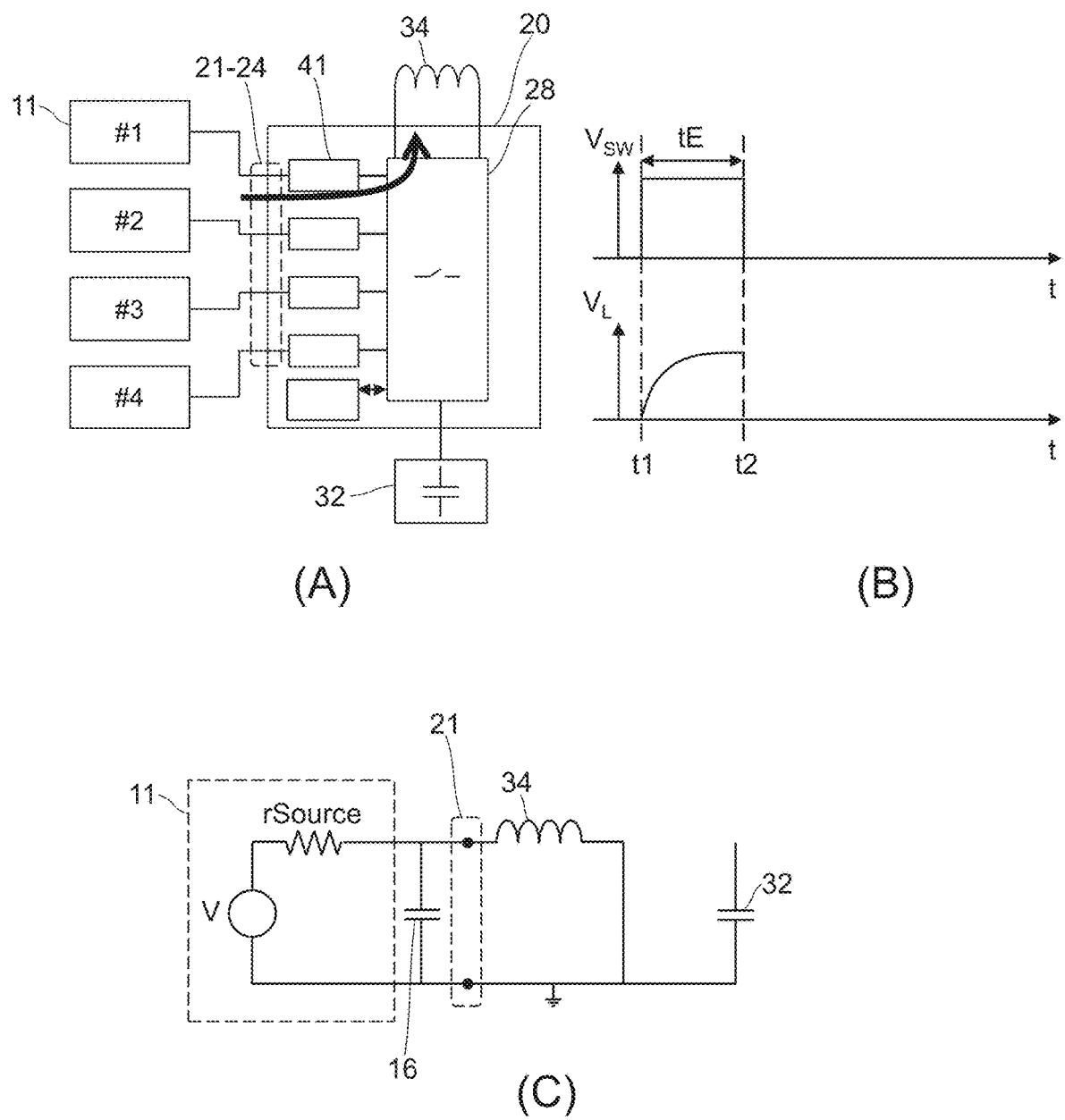
FIG. 3 shows operation of the power management apparatus during an energise phase of one harvesting cycle.
Figure 4:
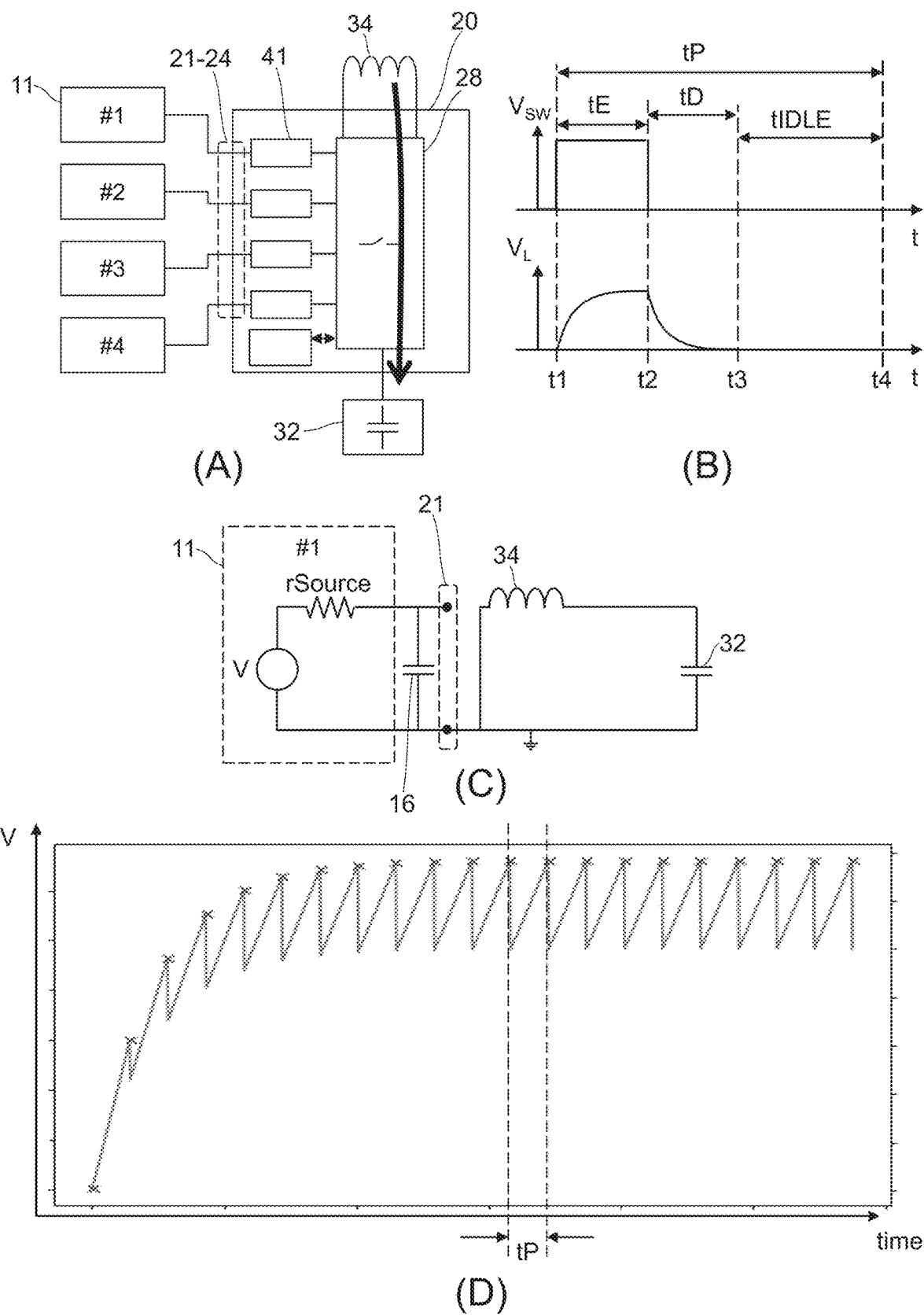
FIG. 4 shows operation of the power management apparatus during a de-energise phase of one harvesting cycle.

FIGS. 3 and 4 show operation of the power management apparatus to transfer energy between one of the input channels 21-24 and the main energy store 32. The power management apparatus is operated in discontinuous conduction mode (DCM). One harvesting cycle for an input channel comprises an energise phase (FIG. 3) and a de-energise phase (FIG. 4). The energise phase transfers electrical energy from the input channel to a magnetic field of the inductor 34. The de-energise phase transfers energy from the magnetic field of the inductor 34 to the energy store 32. This example shows a harvesting cycle for an energy harvesting source 11 connected to input channel #1. A similar process applies to each of the other input channels. Another name for the combination of the energise phase and the de-energise phase is a commutation.

Starting with FIG. 3, the energise phase begins at time t1. The switching circuit 28 connects one of the input channels 21-24 to the inductor 34. The switching circuit 28 comprises one or more switches which are turned on to form a current path through the inductor 34. The switches are turned on for a period tE. During the period tE, a current flows through the inductor 34 and a voltage $V_L$ increases across the inductor, eventually stabilising at a constant value. At time t2 the energise phase ends. Energy which has been transferred to the inductor is now stored in a magnetic field of the inductor 34. The switches are typically turned on continuously for the duration tE. FIG. 3(C) shows an equivalent schematic circuit during the energise phase. The energy harvesting source 11 is connected to the inductor 34 via the input channel 21 and an input capacitor 16. The input capacitor can be part of the energy harvesting source 11 or can be connected between the energy harvesting source 11 and the power management apparatus 20. For example, the input capacitor 16 can be provided on a PCB along with the power management apparatus 20.

Moving on to FIG. 4, the de-energise phase begins at time t2. The switching circuit 28 connects the inductor 34 to the energy store 32. Energy is released from the magnetic field of the inductor 34. A current flows to the energy store 32. A voltage $V_L$ across the inductor decreases and a voltage vStore (not shown) of the energy store 32 increases. At time t3, after a period tD, the voltage $V_L$ across the inductor 34 decreases to zero. Energy has been transferred from the magnetic field of the inductor 34 to the energy store 32.

One harvesting cycle for the input channel #1 has a total duration (period) of tP. There is an idle phase (tIDLE) between times t3 and t4. During this time, the input channel #1 is not connected to the inductor. At time t4, after the period tP, a new harvesting cycle can begin. During the idle phase, the inductor 34 is not used by input channel #1. However, it can be used by another one of the input channels #2-#4, or for another function, such as transferring energy between the main energy store 32 and the internal energy store 33.

The equivalent schematic circuit of FIG. 4(C) applies during the de-energise phase. The inductor 34 is connected to the energy store 32. During this time the energy harvesting source 11 remains connected to the input capacitor 16 and the input channel 21. However, the input channel 21 is not connected to the inductor 34. A period tIDLE occurs between the end of the de-energise period tD and until the start of the next energise period tE. During tIDLE the energy harvesting source 11 remains connected to the input capacitor 16 and the input channel 21. The input channel 21 is not connected to the inductor 34. The inductor 34 is not connected to the energy store 32. The input capacitor 16 functions as an energy storage buffer, re-charging during the periods when it is not connected to the inductor 34. FIG. 4(D) shows voltage on input capacitor 16 over time. After a settling period, the voltage has a generally sawtooth profile. During the energise phase voltage on the input capacitor 16 falls as energy is transferred to the inductor 34. Between energise phases, voltage on the input capacitor 16 rises as energy is transferred from the energy harvesting source 11 to the input capacitor 16.

The two main operating parameters for controlling operation of the switching circuit 28 to transfer energy from an input channel are: tE (energise time) and tP (harvesting cycle period). These parameters cause the power management apparatus 20 to present an impedance to one of the harvesting sources 11-14 connected to the power management apparatus 20. An optimum transfer of energy (power) from a harvesting source to the power management apparatus occurs at a maximum power point (MPP). For a Thevenin source, this is a point where the resistance/impedance of the source 11 is equal to the resistance/impedance of the power management apparatus 20. There are multiple combinations of tE and tP which cause the power management apparatus to operate at the MPP. The harvesting cycle period tP of one of the input channels 21-24 can be different to the harvesting cycle period tP of another one of the input channels 21-24, or can be different to the harvesting cycle period tP of each of the other input channels 21-24.

In operation, the power management apparatus can only service one input channel at a time. That is, the inductor 28 can only be used to transfer energy from one of the input channels to the energy store 34 at a time. From FIGS. 3 and 4, it can be seen that a harvesting cycle for one of the input channels 21-24 requires an amount of inductor time tE+tD. It is useful to define a metric called utilisation which indicates the amount of inductor time used by an input channel. Utilisation, or utilisation factor is defined as:

$$\text{Utilisation} = \frac{tE + tD}{tP} \quad (1)$$

where: tE=energise time; tD=de-energise time; tP=period of the harvesting cycle.

In the example shown in FIG. 4, the utilisation is around 0.5 or 50%. That is, the input channel #1 requires the inductor for 50% of the total available inductor time.

Figure 5:
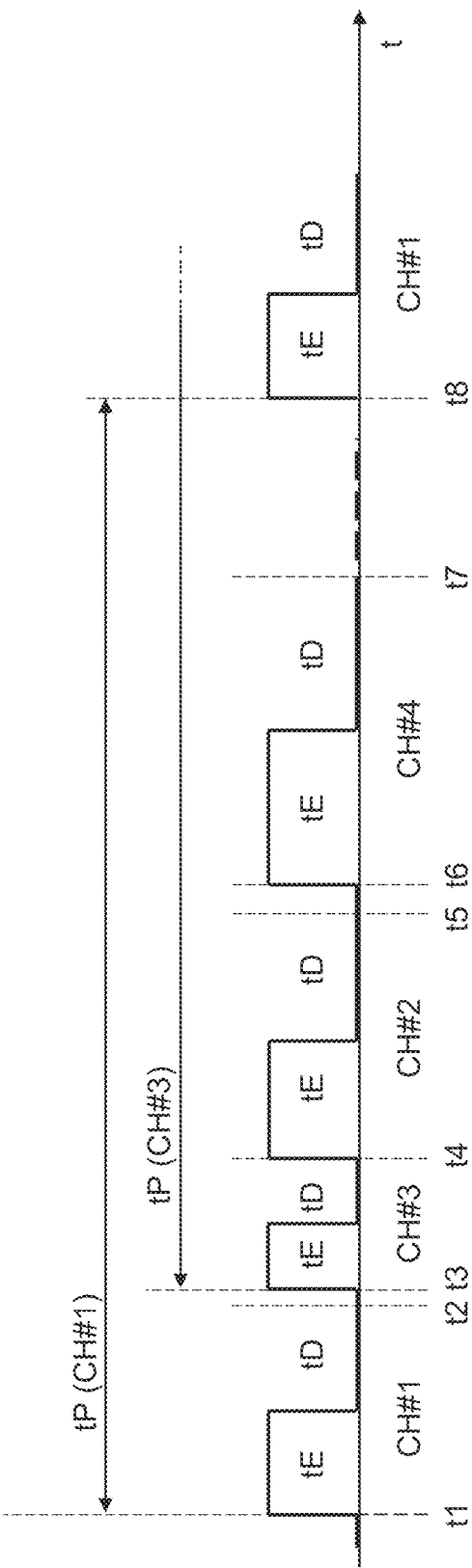
FIG. 5 shows an example of operating the power management apparatus to harvest energy from a plurality of input channels.

FIG. 5 shows an example time line of operating the power management apparatus to transfer energy between a plurality of input channels 21-24 and the main energy store 32. At time t1 the switching circuit connects input channel #1 to the inductor. There is an energise phase tE and a de-energise phase tD. The CH #1 use of the inductor ends at time t2. There is a short period of idle time between times t2 and t3. At time t3 the switching circuit connects input channel #3 to the inductor. Input channels #2 and #4 are serviced in a similar way. There is a short period of idle time between times t7 and t8. At time t8 a period tP has elapsed since the start of tE for input channel #1. This is the harvesting cycle period for input channel #1. At time t8 the switching circuit connects input channel #1 to the inductor. It can be seen that the switching circuit does not operate with a rigidly defined sequence of fixed slots. Instead, requests for connecting to the inductor are serviced on demand. The controller can service requests for connection to the inductor based on priority. This allows efficient use of the inductor time, and allows the inductor to be used for other operations. One example of another function is transferring energy between the main energy store 32 and the internal energy store 33. Similar to energy transfer described above, an energy transfer between the main energy store 32 and the internal energy store 33 comprises an energise phase during which energy is transferred to the magnetic field of the inductor and a de-energise phase during which energy is released from the magnetic field of the inductor to the internal energy store. In this example time line there are some idle periods between active periods when the inductor is used to transfer energy. In other examples, the idle periods may be absent and the inductor is fully utilised.

Figure 6:
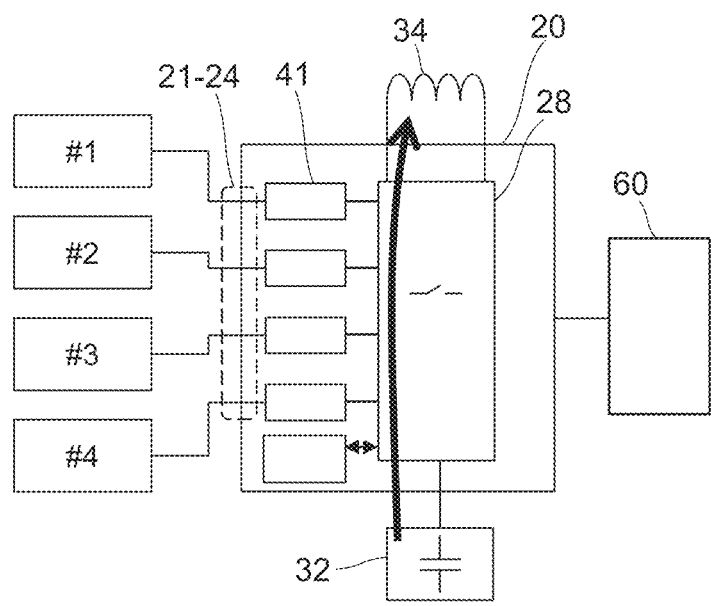
FIG. 6 shows operation of the power management apparatus during an energise phase of transferring energy to a load.
Figure 7:
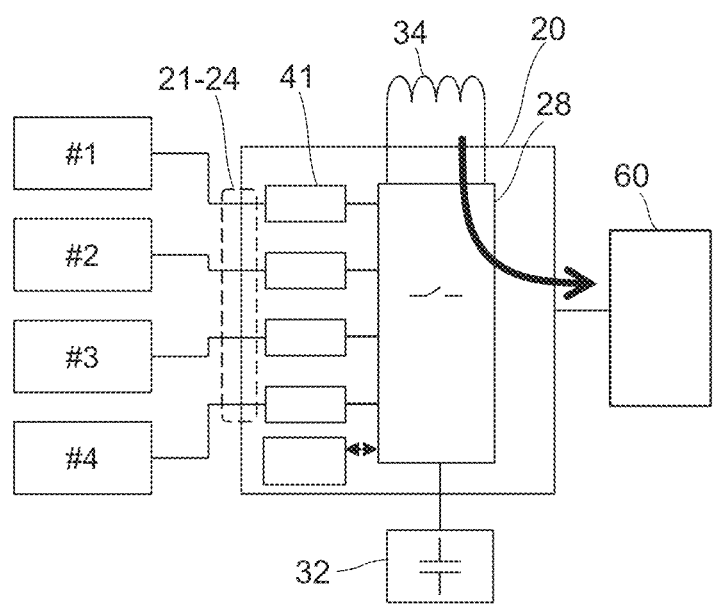
FIG. 7 shows operation of the power management apparatus during a de-energise phase of transferring energy to a load.

FIGS. 6 and 7 show operation of the power management apparatus to transfer energy between the main energy store 32 and the load 60. This is similar to operation shown in FIGS. 3 and 4, except that energy is transferred from the main energy store 32 to the load 60.

One transfer cycle comprises an energise phase (FIG. 6) and a de-energise phase (FIG. 7). The energise phase transfers electrical energy from the energy store 32 to a magnetic field of the inductor 34. The de-energise phase transfers energy from the magnetic field of the inductor 34 to the load 60.

Figure 8:
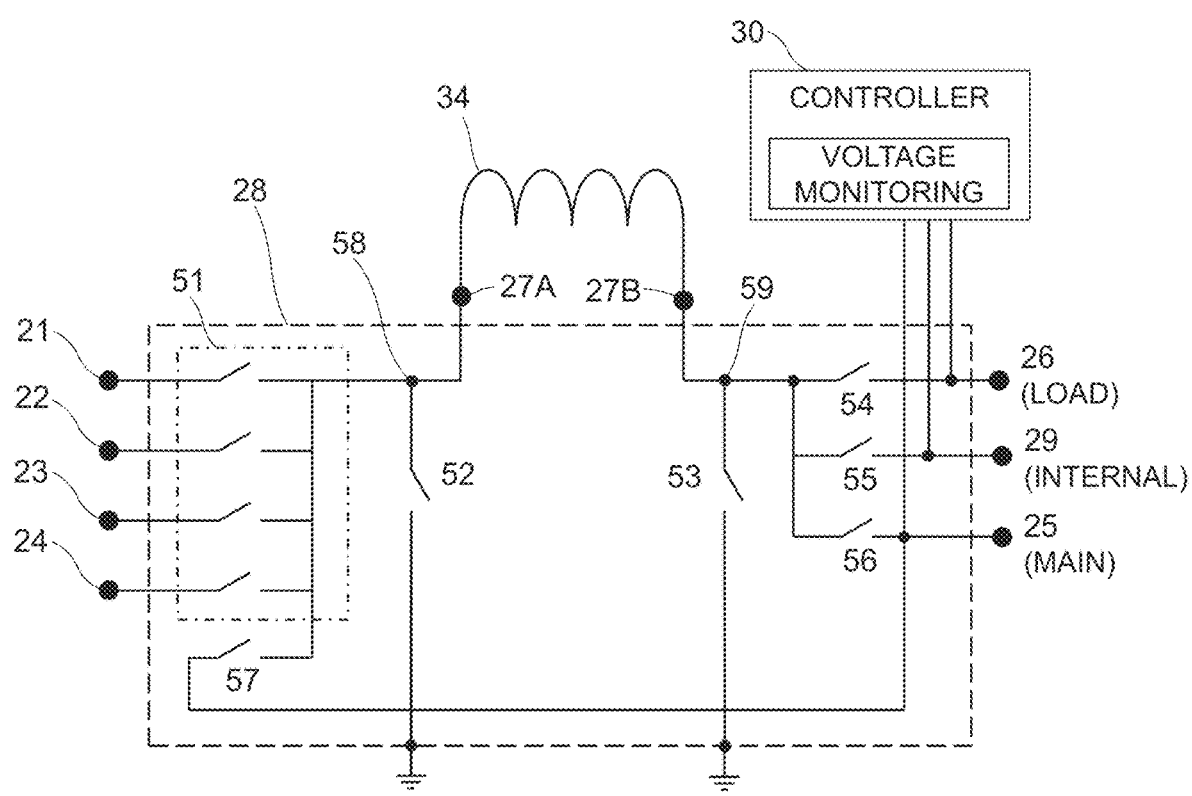
FIG. 8 shows an example of the switching circuit.

FIG. 8 shows an example of the switching circuit 28 in the power management apparatus 20. This is one possible implementation. The general topology is of a buck-boost DC-to-DC converter. A set of switches 51 connect the input channels 21-24 to node 58 at a first side of the inductor 34. The input stages 41-44 in the paths between the input channels 21-24 and the switching circuit 28 are omitted from this drawing for clarity. A switch 52 connects between node 58 and ground at a first side of the inductor 34. A switch 53 connects between node 59 and ground at a second side of the inductor 34. A switch 56 connects between node 59 and the main energy store terminal 25. A switch 55 connects between node 59 and the internal energy store terminal 29. A switch 54 connects between node 59 and the load output terminal 26. A switch 57 connects between the main energy store terminal 25 and node 58. In the energise phase of a transfer between an input channel and the main energy store 32 (FIG. 3), one of the switches in set 51 is closed and switch 53 is closed. This forms a current path through the inductor 34. In the de-energise phase of a transfer between an input channel and the main energy store 32 (FIG. 4), switch 52 is closed, switch 56 is closed and switch 53 is open. This forms a current path from the inductor 34 to the energy store 32. In the energise phase of a transfer between the main energy store 32 and the load 60 (FIG. 5), switch 57 is closed, switch 53 is closed and switch 52 is open. This forms a current path from the energy store 32 through the inductor 34. In the de-energise phase of a transfer between the main energy store 32 and the load 60 (FIG. 6), switch 52 is closed, switch 54 is closed and switch 53 is open. This forms a current path from the inductor 34 to the load. In the energise phase of a main energy store to internal energy store transfer, switch 57 is closed, switch 53 is closed and switch 52 is open. This forms a current path from the main energy store through the inductor 34. In the de-energise phase of the of the main energy store to internal energy store transfer, switch 52 is closed, switch 55 is closed and switch 53 is open. This forms a current path from the inductor 34 to the internal energy store 33. Each of the switches 51-57 can be an electronic switch, such as a field-effect transistor (FET), or any other switching device. Each of the switches 51-57 is controlled by the controller 30.

The controller 30 operates the switching circuit 28. The controller 30 operates the switching circuit 28 to first transfer from any source to the main energy store 32 and then from the main energy store 32 to the internal energy store 33 or to the load. The power management apparatus may operate as a DC-to-DC boost converter or a DC-to-DC buck converter depending on the respective voltages on the input and output sides. For example, the power management apparatus may operate as a DC-to-DC buck converter if the required output voltage is lower than a voltage of the main energy store.

Figure 9:
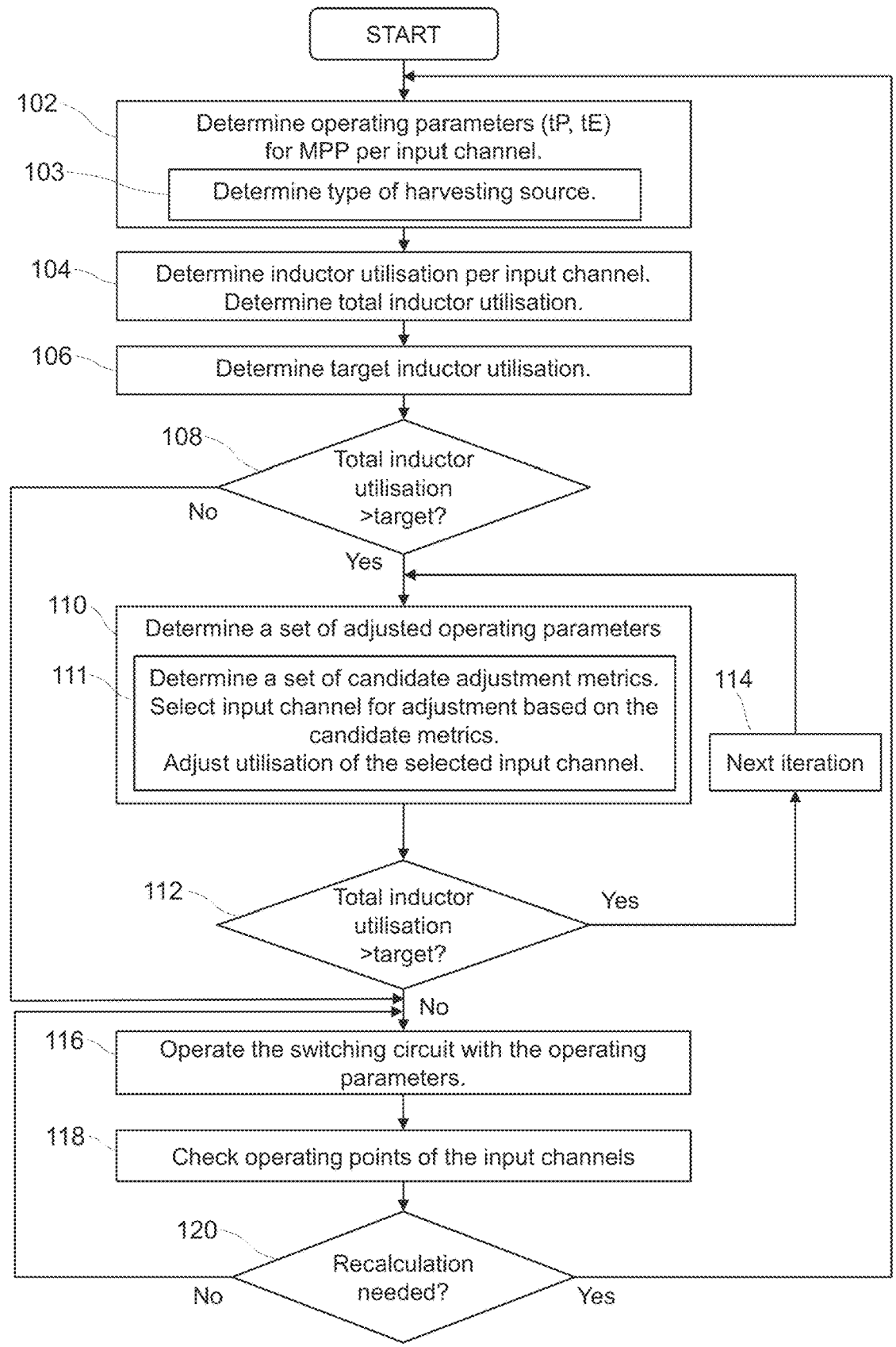
FIG. 9 shows a method of operating the power management apparatus.

FIG. 9 shows an overview of a method of operating the power management apparatus. The method is performed by the controller 30. At block 102, the method determines operating parameters for the switching circuit for each input channel 21-24. The controller determines operating parameters (tE, tP) for each input channel which transfer a maximum amount of power. As described above, there are many pairs of tE, tP values which transfer at the MPP. At the end of block 102, the method has determined a pair of values (tE, tP) for each input channel. As part of block 102, the controller can determine 103 the type of harvesting source per input channel. For example, the harvesting source type for each input channel may be determined as Thevenin, PV, or AC. Other harvesting source types may be determined in addition to, or instead of, the ones listed here.

At block 104 the method determines inductor utilisation per input channel. Utilisation is defined in equation (1) above. The utilisation is the time that the inductor is used by the input channel. This is the utilisation per input channel if the power management apparatus services the input channel at its MPP. If the utilisation of an individual channel is too high (e.g. above a threshold utilisation value), the method may reduce the utilisation of that input channel. This can be achieved by increasing the value of the operating parameter tE. As described above, the MPP maps to many differently valued combinations of the operating parameters tE, tP. For a particular MPP, increasing tE (the energise time) increases the period tP to achieve the MPP and reduces the utilisation. Increasing tE (the energise time) increases the current flowing through the inductor. There is an upper limit on current flowing through the inductor, which places an upper limit on tE.

Also at block 104 the method determines a total utilisation. This is the total demand on inductor time if each input channel is operated at its MPP. This is the sum of the individual channel inductor utilisations calculated at block 104 (optionally, after any adjustment to the inductor utilisations of individual channels). Total utilisation at an iteration n can be defined as:

$$\text{totalUtilisation}[n] = \Sigma_{i=1}^{channels} \text{adjustment}_i[n] * \text{utilisation}_i \qquad (2)$$

At block 106 the method determines a target utilisation. This is a portion of the total inductor time which is available for the transferring energy between input channels 21-24 and the main energy store 32. An example value is 0.75. This value can be set by the controller 30. The target utilisation can be static or dynamic. For example, the target utilisation can be set based on factors such as an expected amount of time required for other functions, such as transferring energy from the main energy store 34 to the internal energy store 33.

At block 108 the total utilisation (block 104) is compared with the target utilisation. If the total utilisation is less than, or equal to, the target utilisation then no further adjustment is required. If the total utilisation is more than the target utilisation then some adjustment of the per-channel operating parameters (tE, tP) is required. The method proceeds to block 110.

At block 110 the method begins an iterative process of determining a set of adjusted operating parameters for the switching circuit. Qualitatively, the function selects the channel for which the biggest reduction in utilisation delivers the lowest reduction in an amount of power. Qualitatively, the function selects the channel with the highest utilisation that delivers the lowest amount of power.

At block 111, the method determines an adjustment metric for each of the input channels 21-24. This gives a set of candidate adjustment metric values. Each adjustment metric value is indicative of a change in inductor utilisation factor (deltaUtilisation) and a corresponding change in power (deltaPower) for that input channel. In simple terms, how much does the power change if a change is made to utilisation of that input channel? This can be defined as:

$$\frac{deltaUtilization}{deltaPower} \qquad (3)$$

and as:

$$= \frac{\text{adjustment}_i[n] * \text{startingUtilisation}_i}{deltaPower} \qquad (4)$$

where:
adjustment$_i$ [n] is the change (step size) in utilisation of the input channel i at the current iteration [n] of the method; and starting Utilisation, is the starting value of utilisation of the input channel i.

deltaPower is the change in power corresponding to the change in utilisation.

The method selects one of the input channels for adjustment based on the set of candidate adjustment metric values and then adjusts utilisation of the selected input channel. The utilisation can be adjusted by changing one or both of tE, tP. For example, the method may maintain tE as a constant value and adjust tP of an input channel at each iteration. Alternatively, the method may maintain tP as a constant value and adjust tE of an input channel at each iteration. Alternatively, the method may adjust both tE and tP of an input channel at an iteration of the method. The selection of which operating parameter to adjust may be based on the type of energy harvesting source determined at block 102. For example, the controller may maintain tE as a constant value and adjust tP if an input channel is connected to a DC source type (Thevenin, PV), and may maintain tP as a constant value and adjust tE if an input channel is connected to an AC source type. Adjusting the utilisation will move the selected input channel away from the MPP. However, by selecting a channel for a utilisation adjustment which has the least effect on power, it is possible to maximise overall transfer from the input channels.

The value of the parameter "deltaPower" in equations 3 and 4 is dependent on the type of energy harvesting source determined at block 111. As described in more detail below, different types of source respond differently to a change in utilisation from the MPP. The controller stores data which models the relationship between change in utilisation and change in power for various source types. The controller uses this data to determine the parameter "deltaPower" at each iteration of the method.

A step size of the adjustment step size applied in equation 4 can be based on the type of energy harvesting source determined at block 111. For example, a step size of 0.125 (⅛) can be applied for input channels connected to Thevenin sources, and a smaller adjustment of 0.0625 (1/16) can be applied for input channels connected to PV sources. Similarly, the method may use the same, or a different, step size for another type of source.

Other values of adjustment step size can be used. For example, the step size in the utilisation can be increased to 0.25 (¼), or reduced to 0.0625 (1/16). From simulations, it has been found that using finer increments in the utilisation step size can allow for a more optimal result (i.e. higher power transfer from the combination of input channels), but at the expense of increased power required to implement the computation of the method.

In the example above, the adjustment metric is deltaUtilisation/deltaPower. A large value of this adjustment metric indicates a big change in utilisation versus power or, stated another way, the smallest effect on power for a change in utilisation. Therefore, the method selects the input channel associated with the adjustment metric having the largest value. Alternatively, it is possible to define the adjustment metric as deltaPower/deltaUtilisation. A small value of this adjustment metric indicates a big change in utilisation versus power. Therefore, the method selects the input channel associated with the adjustment metric having the smallest value. Both forms of the adjustment metric have the same effect. By selecting the input channel for adjustment in this manner, the power management apparatus should still operate at a near optimal state.

It may be desirable to set a minimum allowed utilisation for an input channel. When an input channel has reached the minimum allowed utilisation it is removed from the set of candidates for adjustment. The input channel remains in use (i.e. it is still used at block 116) but its utilisation is not adjusted any further from the minimum value. Maintaining an input channel in an active state allows it to be periodically checked for changes.

At block 112 the method determines the new total inductor utilisation. If the total inductor utilisation is less than (or equal to) the target value, then no further adjustment of the operating parameters (tE, tP) is required. If the total inductor utilisation is greater than (or equal to) the target value, then a further iteration of the method is required to bring the utilisation within the target value, shown by block 114 and a return to block 110. On a subsequent iteration of block 110, the candidate adjustment metrics determine an effect of a change in utilisation. If an input channel has already been adjusted (e.g. utilisation scaled by 0.875 (⅞)) then the calculation of the candidate adjustment metric uses the next increment of the utilisation scale factor (e.g. utilisation scaled by 0.75 (¾)). If an input channel has not been adjusted (e.g. utilisation scaled by 1.0) then the calculation of the candidate adjustment metric uses the first utilisation scale factor (e.g. utilisation scaled by 0.875 (⅞)).

The iterative method continues until block 112 determines that the total inductor utilisation is less than (or equal to) the target value.

When block 112 succeeds in determining a set of adjusted parameters which meet the required target utilisation, the method proceeds to block 116. The controller operates the switching circuit with the determined operating parameters. The controller can remain in this state for a period of time.

During operation, conditions can change. For example, light levels may vary, causing a PV source to appear more resistive, which can cause the set of parameters calculated at block 102 and block 110 to be non-optimal. At block 118, the method checks whether each of the input channels are still operating at the MPP. This can be achieved by restoring the channel to the operating parameters for the MPP having the values computed at block 102 and performing sufficient commutations to achieve steady-state operation. The values of the operating parameters at the MPP will be called tE1, tP1. The method then modifies one of the operating parameters tP or tE and monitors the change in power. If the source is still operating at the MPP, the monitored power at a higher parameter value (e.g. tE increased from tE1) and the monitored power at a lower parameter value (e.g. tE decreased from tE1) will be lower power.

Block 120 determines if a recalculation is required. As noted above, if block 118 determines that an input channel is no longer operating at the MPP, then recalculation is required and the method returns to block 102. If the method determines that a change is required to the operating parameters (tE, tP) for an individual channel, then there will be a change in the total utilisation. In one possible implementation, the method can repeat blocks 102, 104, 106, 108, 110, 112. In another possible implementation, the method can store (cache) values from block 110 for at least the previous time the method was performed. This can allow the controller to avoid performing some computations if values have not changed. For example, if the power management apparatus is connected to four input channels, and there has only been a change to input channel #1, at least some computations for input channels #2, #3 and #4 are still valid and do not need to be recomputed.

There are some other conditions or criterion which can require a recalculation of per-input channel operating parameters and/or an adjusted set of operating parameters. These include one or more of:

- an input channel has moved from the MPP due to a change in environmental conditions (e.g. a change in illumination level). In the case of a PV cell, a change in illumination level can significantly change the power curve of the cell. This means that the operating parameters (tE, tP) previously calculated will no longer present an optimal impedance for maximum power transfer.
- a change in state of an input channel, e.g. from inactive to active, or from active to inactive.
- a change in inductor usage requirements. For example, the power management apparatus may require more, or less, main energy store-to-internal energy store transfers. This affects the amount of inductor time which is available for transferring energy between input channels 21-24 and the main energy store 32. This affects the target utilisation used at block 108.
- a voltage (vStore) of the main energy store. The value of vStore affects the de-energise time tD, which affects all of the utilisation factors;
- a change in voltage of the energy storage element since the determination of an existing set of adjusted operating parameters. This changes the de-energise time tD, which changes all of the utilisation factors;
- a predetermined time period has elapsed since the determination of a set of adjusted operating parameters;
- a start of a new period in which energy is not transferred to the load (72, FIG. 2).

The method shown in FIG. 9 may be performed during a period when the power management apparatus does not power the load, such as times t2-t3 and t4-t5 of FIG. 2. The method shown in FIG. 9 may be performed during a period when the power management apparatus does power the load, such as times t3-t4 and t5-t6. In this case, block 106 can determine the target utilisation (available for energy harvesting) based on an amount of inductor time required for transferring energy between the energy store and the load. While FIG. 9 shows blocks arranged sequentially in a particular order, it will be understood that at least some of the functions may be performed concurrently, or in a different order.

It will be understood that the power management apparatus may have at least one energy harvesting input channel which is not connected to an energy harvesting source. For example, the power management apparatus may have a total of four energy harvesting input channels 21-24, with three of the energy harvesting input channels 21, 22, 23 each connected to a respective energy harvesting source, and one energy harvesting input channel 24 not connected to an energy harvesting source. In this case, it will be understood that the method (e.g. blocks 102, 104, 106, 110) only operates on the input channels which are connected to an energy harvesting source.

Some further details will now be described.

Energy Harvesting Source Types

The power management apparatus can connect to a plurality of different types of energy harvesting source. Some of these types will now be described. FIG. 10 shows a model representation of a Thevenin source. The Thevenin source can be represented as a voltage source 61 and a resistance rSource 62. The accompanying graph shows normalized power versus rLoad. Maximum transfer of power (MPP) occurs when the load resistance rLoad matches the source resistance. In this example, the MPP occurs when the load resistance is around 100 Ohms. Referring back to the method of FIG. 9, block 102 finds the MPP. This will be associated with a pair of values (tE, tP) which cause the power management apparatus to present an impedance at which the power curve is at a maximum. Examples of energy harvesting sources which can be represented as a Thevenin source include: an electrodynamic source; a TEG source; a PV source under low illumination.

FIG. 11 shows a graph of a normalised Thevenin power curve. This curve represents how power varies with changes to rSource for a Thevenin source. The relationship between the resistance of the source (rLoad) and the resistance of the power management apparatus (rLoad) can be expressed as:

$$rLoad = alpha * rSource$$

The relationship between power and alpha can be expressed as:

$$power(alpha) = \frac{4\ alpha}{(1 + alpha)^2}$$

The graph is normalised, so that maximum power=1 occurs when alpha=1. The accompanying table shows pairs of values of alpha and power. When alpha is reduced or increased by a factor of 2 (alpha=0.5), power falls to 8/9 of the maximum power. When alpha is reduced or increased by a factor of 4 (alpha=0.25), power falls to 16/25 of the maximum power.

Figure 12:
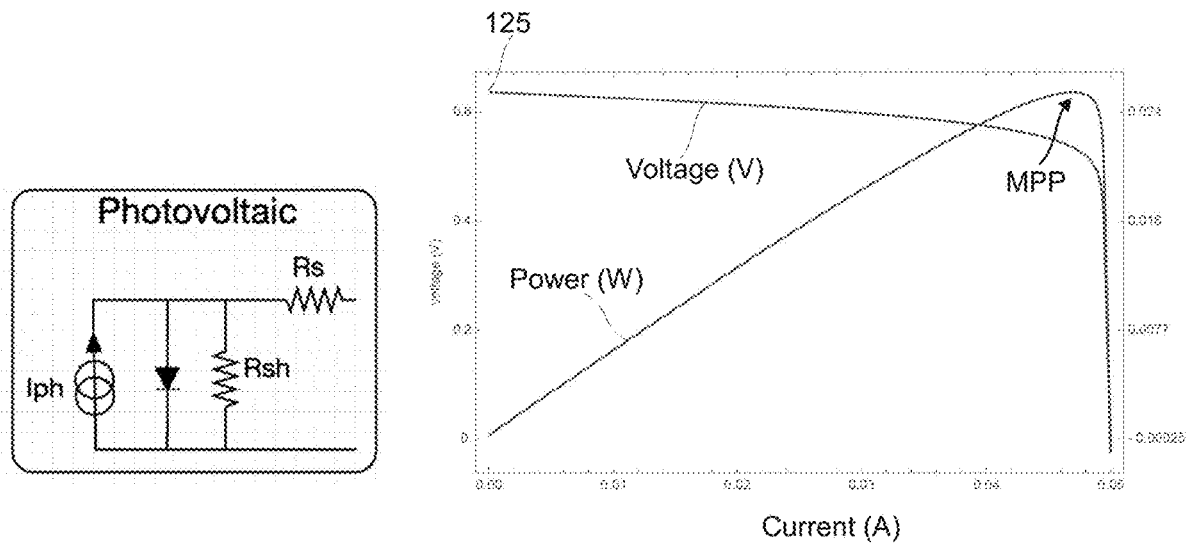
FIG. 12 shows a model representation of a PV source and a power curve for a PV source.

FIG. 12 shows a model representation of a PV source. The accompanying graph shows power versus current, and voltage versus current, for a fully illuminated PV cell. The optimality point (MPP) is close to the open-source voltage 125.

Figure 13:
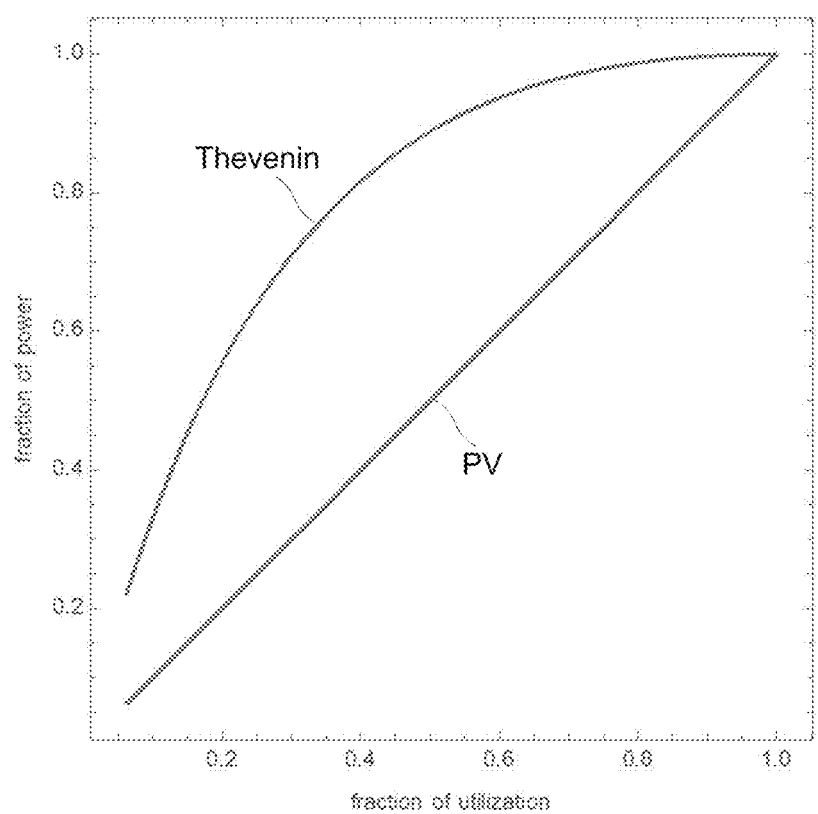
FIG. 13 shows a graph relating power and utilisation for different source types.

FIG. 13 shows change in power versus change in utilisation for a Thevenin source and a PV source (under full illumination). This graph is normalised about the maximum power point. This graph represents change in power versus change in utilisation as utilisation is changed from the values which give the MPP. It can be seen that as a Thevenin source is initially moved from the MPP, there is a relatively small effect on the power. In contrast, the relationship between change in power versus change in utilisation is linear with the PV source. This graph shows that, for sources with the same power and utilisation, it is more desirable to adjust the utilisation of a Thevenin source, rather than a PV source, during the early iterations of the method of FIG. 9.

The power curve of the PV source changes with different levels of illumination. As illumination level decreases, the PV curve shown in FIG. 13 moves closer to the Thevenin curve.

AC sources have an alternating voltage and current. The power management apparatus 20 may comprise an input channel stage which converts an alternating current signal to a positive half wave version of the signal. This means that negative going parts of the AC signal are converted to positive going representations. The varying nature of AC sources means that power varies with time over the duration of an AC cycle. For AC sources, the controller may average power readings over a period of time (e.g. at least one half wave and preferably over multiple half waves) and/or the controller may determine a peak value of an AC source.

The differences between the effect of changes to utilisation on power transfer for different types of energy harvesting sources present a challenge for optimising operation of the power management apparatus when combining input channels.

Worked Example

A worked example of the method will now be described. It is assumed that the method has performed blocks 102, 104 and determined operating parameters (tE, tP) for each input channel at the MPP, and corresponding utilisation factors. Four input channels have the initial values (at MPP) of:

| | | | |
|---|---|---|---|
| channel 1: | start utilisation = 0.426673; | start power = 52; | type = Thevenin |
| channel 2: | start utilisation = 0.205374; | start power = 49; | type = Thevenin |
| channel 3: | start utilisation = 0.268607; | start power = 24; | type = PV |
| channel 4: | start utilisation = 0.250641; | start power = 45; | type = Thevenin |

FIG. 14 shows the first three iterations of the method to adjust operating parameter values. Initially, the total utilisation=1.1513, which is well above the target utilisation of 0.75. FIG. 14 shows that the method reduces the utilisation of channels 1, 2 and 4 which are connected to Thevenin sources. Channel 1 and channel 4 are reduced to 0.5 of their initial utilisation, while channel 2 is reduced to 0.625 of its initial utilisation. This brings the total utilisation within the target value.

At iteration 1, channel 1 is selected as the channel to reduce its utilisation. While its starting power is higher than the other channels, its utilisation is significantly more and given that it is a Thevenin channel, adjusting it reduces its power by only a small amount. The utilisation of channel 1 is adjusted to 0.875 (⅞) and the power is adjusted by 0.9956 ($^{224}/_{225}$). On the second iteration, channel 4 is selected for change. On the third iteration, channel 2 is selected for change. On the fourth iteration, channel 1 is (again) selected for change. As it is the second adjustment to that channel, the utilisation adjustment is 0.25 (=0.125+0.125). The highlighted row at each iteration shows the changed channel. The final columns shows the adjusted utilisation and adjusted power as the algorithm proceeds. The method ends when the adjusted utilization is below the target, which for this example was set to 0.75. FIG. 15 shows the end result of the method. Each of the Thevenin sources has been adjusted from their respective MPPs. For channels 1 and 3 the utilisation is adjusted by a scale factor of 0.5 (i.e. utilisation is halved), and for channel 2 the utilisation is adjusted by a scale factor of 0.625 (=⅝). The PV source connected to channel 3 is unchanged. While the changes to utilisation are significant, the changes in power are relatively small. For channels 1 and 3 the power is reduced by a scale factor of 0.889 (=⁸⁄₉) and for channel 2 the power is reduced by a scale factor of 0.946746 (=160/169). Utilisation for the four channels has been reduced from a starting value of 1.1513 down to 0.74.

Simplifying Calculations

There are various ways in which the computation performed by the method of FIG. 9 can be simplified to improve efficiency and reduce energy consumption of the controller. One way of simplifying calculations is by pre-computing some values. For example, FIG. 14 shows the normalised relationship between change in power and change in utilisation for two types of energy harvesting source. It is possible to pre-compute delta utilisation divided by delta power change. This takes the same set of values each time the method is performed.

Single Channel Optimisation

At FIG. 9, block 102, the method determines operating parameters for the switching circuit for each input channel 21-24. The controller determines operating parameters (tE, tP) for each input channel which transfer a maximum amount of power from the energy harvesting source connected to the input channel.

The MPP can be found in various ways. One example is a hill climbing algorithm. The aim of the hill climbing algorithm is to find a peak of the power curve (e.g. FIGS. 10, 11). The controller selects a value of tE and tP and performs a harvesting cycle with an energise phase (of duration tE) and a harvesting cycle period tP. The controller 30 monitors the subsequent de-energise time tD. The de-energise time tD can be monitored by monitoring a voltage between an output of the inductor (e.g. node 59 of the switching circuit shown in FIG. 8) and ground. For a given store capacitor voltage, the time taken for the voltage across the inductor 34 to return to zero (i.e. tD) is proportional to the de-energise current, which is indicative of power. Energy from an inductor is:

$$energy = \tfrac{1}{2}LI^2$$

where L is the inductance and I is the current,
and the power from the inductor is:

$$power = \frac{energy}{time} = \frac{energy}{period}$$

The time taken for the voltage across the inductor 34 to return to zero is indicative of the energy/power that has been transferred from the source. By iteratively adjusting tE and/or tP, it is possible to test different combinations of tE and tP and monitor the effect on tD. If an adjustment in tE or tP (e.g. by increasing tE) increases measured power, then a further adjustment is made in the same direction (i.e. a further increase in tE). When an adjustment does not obtain an increase in measured power, then the algorithm determines that it has passed the peak of the power curve, and can select a parameter value which is between the last two values. By an iterative process, the algorithm can find the peak of the power curve. The measurements obtained are "pseudo-power" as they are indicative of power. They are not an actual measure of power because current is not measured. It is not necessary to measure the actual power. It is only necessary to find the peak point of the power curve by making pseudo-power measurements.

It will be understood that monitoring the time taken for the voltage across the inductor 34 to return to zero is one possible way of determining energy/power that has been transferred from the source. Another possible way is to measure the inductor voltage (at its peak). Another possible way is to provide a circuit which can directly measure inductor current.

Figure 16:
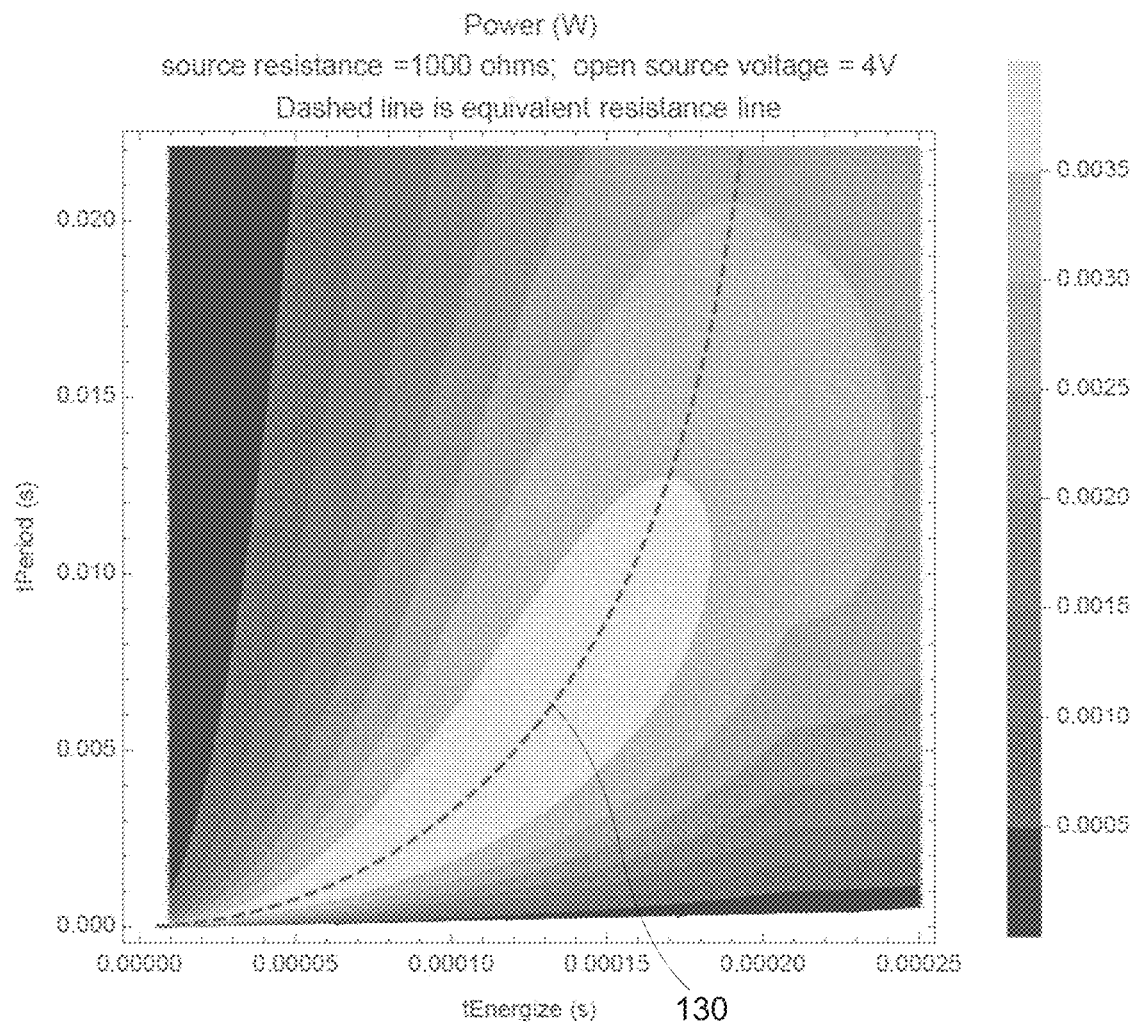
FIG. 16 shows a graph relating operating parameters (tE, tP) and equivalent impedance.

FIG. 16 shows an example of a contour plot relating operating parameters (tE, tP) and power. Regions of the same shade are equal power. Dashed line 130 is a line which represents values of tE and tP which meet the requirement that the source impedance matches the power management apparatus/load impedance, i.e. the MPP. It can be seen that there are many different combinations of pairs of tE and tP for the MPP. Some of these are more desirable than others. It can be advantageous to increase tE because tP is related to tE by a square law relationship. An increase to tE increases tP by a square law relationship and reduces the utilisation factor. However, there are practical limits on tE. Increasing tE increases inductor current and increases resistive (12R) losses. Also, increasing tE and tP causes more ripple on the output signal.

Figure 17:
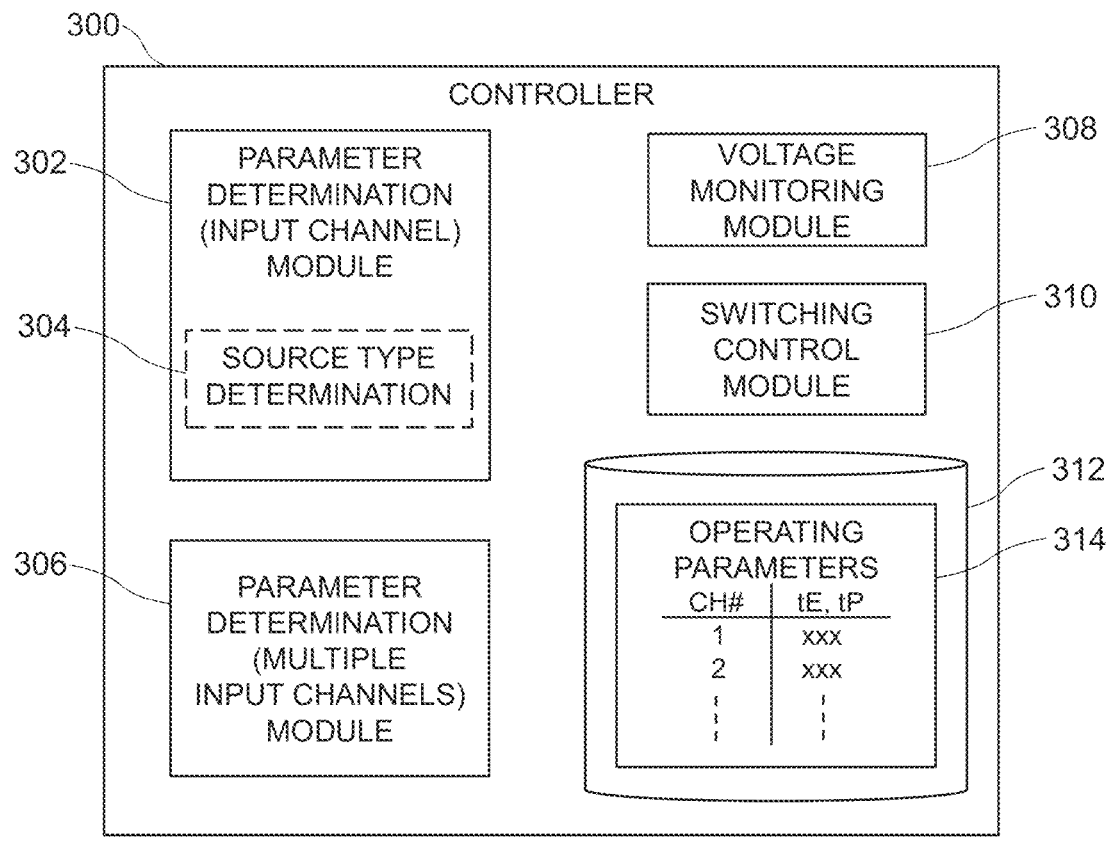
FIG. 17 schematically shows a processing apparatus for implementing the controller.

FIG. 17 schematically shows an example of a processing apparatus 300 which may be used to implement the controller 30. The processing apparatus 300 comprises a parameter determination module 302 which is configured to determine operating parameters for an input channel. Module 302 comprises a module 304 which is configured to determine a type of a source connected to an input channel. The processing apparatus 300 comprises a parameter determination module 306 which is configured to determine adjusted operating parameters for a plurality of input channels. The processing apparatus 300 comprises a voltage monitoring module 308 which is configured to monitor voltages. The voltage monitoring module 308 is used by the parameter determination module 302, in conjunction with a timer, to measure "pseudo power" as described above. The processing apparatus 300 comprises a switching control module 308 which is configured to control the switching circuit 28. The processing apparatus 300 comprises a store 312 which is configured to store data used by the other modules. Store 312 is configured to store operating parameter values 314 for the input channels. Module 302 is configured to determine initial values of the operating parameter values 314. Module 306 is configured to adjust the initial values of the operating parameter values 314.

Figure 18:
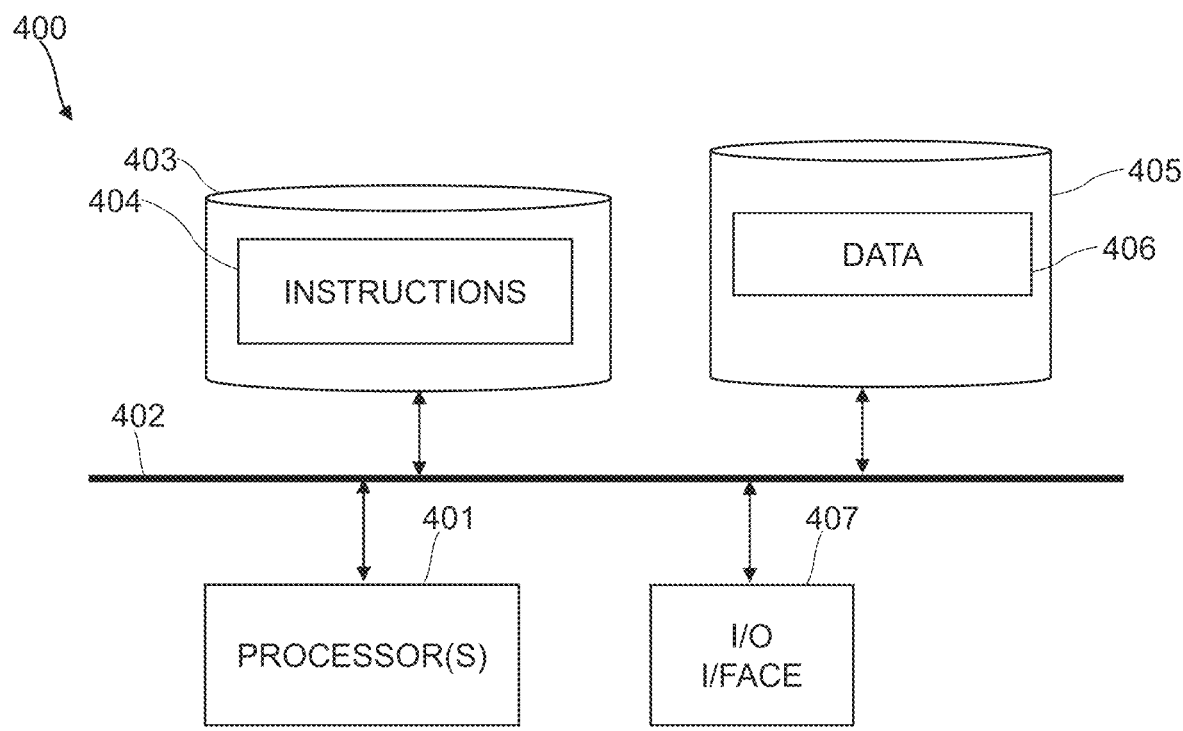
FIG. 18 schematically shows another processing apparatus for implementing the controller.

FIG. 18 shows another example of a processing apparatus 400 which may be used to implement the controller 30. Processing apparatus 400 comprises one or more processors 401 which may be any type of processor for executing instructions to control the operation of the device. The processor 401 is connected to other components of the apparatus via one or more buses 402. Processor-executable instructions 404 may be provided using any data storage device or computer-readable media, such as memory 403. The processor-executable instructions 404 comprise instructions for implementing the functionality of the described methods. The memory 403 is of any suitable type such as non-volatile memory, a magnetic or optical storage device. Memory 405, or memory 403, stores data used by the processor. The processing apparatus 400 comprises an I/O interface 407.

In this description, the inductor 34 has a single coil. It is also possible to use an inductor comprising a single coil with a plurality of tap points to allow connections to be made to the coil at different positions along its length, or an inductor comprising a plurality of coils which are magnetically coupled to each other (e.g. by sharing a common magnetic core). The inductor can be of the form described in UK Patent GB 2 553 367. In an example with an inductor having a plurality of tap points, the controller can connect to any of the tap points during the energise phase of a transfer between an input channel and the energy store. The controller can connect to any of the tap points during the de-energise phase of a transfer between an input channel and the energy store. The tap points used in the energise phase and the de-energise phase can be the same, or different. Similarly, the controller can connect to any of the tap points during the energise phase of a transfer from the energy store to the load. The controller can connect to any of the tap points during the de-energise phase of a transfer from the energy store to the load. The tap points used in the energise phase and the de-energise phase can be the same, or different. The different tap points provide a set of different "gears".

The power management apparatus 20 can be implemented as a power management integrated circuit (PMIC). The functionality of the power management apparatus, including the switching circuit 28 and controller 30 may be implemented as a single integrated circuit (e.g. a single mixed-signal integrated circuit) or as a plurality of integrated circuits (e.g. an integrated circuit with analog circuits and an integrated circuit with digital circuits). The PMIC has inputs 21-24 for connecting to external energy harvesting sources 11-14. The PMIC has connections or terminals 27 for connecting to an external inductor 34. The PMIC has at least one output 26 for connecting to a load (or multiple loads). The PMIC and inductor 34 may be provided on the same printed circuit board (PCB). The PMIC has an output 25 for connecting to an energy store 32. The PMIC and energy store 32 may be provided on the same printed circuit board (PCB). The PMIC may have an output 29 for connecting to an internal energy store 33. The PMIC and internal energy store are typically provided on the same PCB.

In another example implementation, the controller 30 can be implemented as a processor (e.g. microcontroller or microprocessor) which is separate to the power management apparatus 20. The processor can execute instructions to perform the method described above.

The invention claimed is:

1. A power management apparatus comprising:
   a plurality of energy harvesting input channels each for connecting to an electrical energy harvesting source;
   a first energy storage element connection for connecting to an energy storage element;
   an inductor connection for connecting to an inductor;
   a switching circuit which is configured to selectively connect to the energy harvesting input channels, the inductor connection and the first energy storage element connection; and
   a controller which is configured to:
      operate the switching circuit to transfer energy between the energy harvesting input channels and the first energy storage element connection by a sequence of energy transfer cycles, each of the energy transfer cycles comprising:
         an energise phase in which energy is transferred from one of the plurality of energy harvesting input channels to the inductor connection for an energise time (tE) to transfer energy to the inductor and;
         a de-energise phase in which energy is transferred from the inductor connection to the first energy storage element connection for a de-energise time (tD),
      wherein each energy harvesting input channel is allocated a plurality of the energy transfer cycles, with a harvesting cycle period (tP) between start times of successive energy transfer cycles, and the plurality of energy harvesting input channels are connected to the inductor connection in a time-multiplexed manner;
      determine operating parameters for operating the switching circuit by:
      determining, for each of the energy harvesting input channels, maximum power operating parameters which transfer a maximum power from the electrical energy harvesting source connected to the energy harvesting input channel and a maximum power inductor utilisation factor representing a portion of time for which the inductor is required by that input channel to transfer the maximum power;
      determine a maximum inductor utilisation factor representing a total amount of time for which the inductor can be used to transfer energy between the energy harvesting input channels and the energy storage element;

determine a sum of the inductor utilisation factors for the plurality of energy harvesting input channels;

compare the sum of the inductor utilisation factors with the maximum inductor utilisation factor; and if the sum of the inductor utilisation factors is greater than the maximum inductor utilisation factor, determining a set of adjusted operating parameters for sharing use of the inductor between the plurality of energy harvesting input channels in the time-multiplexed manner, wherein at least one of the energy harvesting input channels is selected for an adjustment of the operating parameters from the maximum power operating parameters, the selection based on an effect of a change in the inductor utilisation factor and a corresponding change in power of the energy harvesting input channel, wherein the set of adjusted operating parameters (tE, tP) are determined such that a sum of adjusted inductor utilisation factors is less than the maximum inductor utilisation factor.

2. An apparatus according to claim 1 wherein the controller is configured to determine the set of adjusted operating parameters (tE, tP) by:

determining an adjustment metric for each energy harvesting input channel to give a set of candidate adjustment metric values, where each adjustment metric value is indicative of a change in inductor utilisation factor and a corresponding change in power;

selecting one of the energy harvesting input channels for adjustment based on the set of candidate adjustment metric values; and adjusting the operating parameters (tE, tP) for the selected energy harvesting input channel.

3. An apparatus according to claim 2 wherein:

each candidate adjustment metric value is a ratio of a change in inductor utilisation factor to a change in power, and wherein selecting one of the energy harvesting input channels for adjustment comprises selecting the input channel associated with the adjustment metric having a largest value; or each candidate adjustment metric value is a ratio of a change in power to a change in inductor utilisation factor, and wherein selecting one of the energy harvesting input channels for adjustment comprises selecting the energy harvesting input channel associated with the adjustment metric having a smallest value.

4. An apparatus according to claim 1 wherein the controller is configured to determine the set of operating parameters by:

determining a type of electrical energy harvesting source connected to each of the energy harvesting input channels; and using the determined type of electrical energy harvesting source in determining the set of adjusted operating parameters.

5. An apparatus according to claim 4 wherein the corresponding change in power is based on the determined type of electrical energy harvesting source.

6. An apparatus according to claim 4 wherein a step size of the change in the inductor utilisation factor is based on the determined type of electrical energy harvesting source.

7. An apparatus according to claim 4, wherein the controller uses a set of pre-computed or stored values to determine the set of adjusted operating parameters.

8. An apparatus according to claim 4 wherein the type is at least one of: Thevenin source, photovoltaic source, thermo-electric generator and alternating current source.

9. An apparatus according to claim 1 wherein the operating parameters for each of the plurality of channels comprise an energise time (tE) and a harvesting cycle period (tP) and the controller is configured to determine the set of adjusted operating parameters by one of:

maintaining tE as a constant value and adjusting tP;
maintaining tP as a constant value and adjusting tE.

10. An apparatus according to claim 1 wherein the controller is configured to:

determine, for at least one of the input channels, a different value of at least one of the maximum power operating parameters to achieve a reduced inductor utilisation factor for that energy harvesting input channel before determining the set of adjusted operating parameters.

11. An apparatus according to claim 1 wherein the controller is configured to determine the set of adjusted operating parameters (tE, tP) for the switching circuit by an iterative process which uses an incremental change in inductor utilisation factor at each iteration.

12. An apparatus according to claim 1 wherein the power management apparatus comprises a load output, the switching circuit is configured to selectively connect to the load output and the controller is also configured to operate the switching circuit to transfer energy from the first energy storage element connection to the load output via the inductor connection.

13. An apparatus according to claim 12 wherein the power management apparatus is configured to determine the maximum inductor utilisation factor based on inductor time required to transfer energy from the energy storage element to the load output via the inductor connection.

14. An apparatus according to claim 12 wherein the controller is configured to operate the switching circuit to transfer energy from the first energy storage element connection to the load output by a plurality of transfer cycles, each transfer cycle comprising:

an energise phase in which energy is transferred from the first energy storage element connection to the inductor connection for an energise time (tE) to transfer energy to the inductor and;

a de-energise phase in which energy is transferred from the inductor connection to the load output for a de-energise time (tD).

15. An apparatus according to claim 1 wherein the inductor utilisation factor for an input channel is represented by:

Utilisation=$(tE+tD)/tP$ where: tE is a duration of the energise phase,
tD is a duration of the de-energise phase,
tP is the harvesting cycle period.

16. An apparatus according to claim 1 wherein the controller is configured, during operation with the set of adjusted operating parameters, to:

determine if each of the energy harvesting input channels is operating substantially at a maximum power point; and if one or more of the energy harvesting input channels is no longer operating substantially at a maximum power point, determining new maximum power operating parameters for the one or more of the energy harvesting input channels.

17. An apparatus according to claim 16 wherein, if one or more of the energy harvesting input channels is no longer operating substantially at a maximum power point, the controller is configured to determine a new set of adjusted operating parameters using the new maximum power operating parameters.

18. An apparatus according to claim 1 wherein the controller is configured to determine a further set of adjusted operating parameters based on at least one of:
a change in state of an energy harvesting input channel;
a voltage of the energy storage element;
a change in voltage of the energy storage element since the determination of an existing set of adjusted operating parameters;
a predetermined time period elapsing since the determination of a set of adjusted operating parameters;
a start of a new period in which energy is not transferred to the load;
a change in inductor usage requirements.

19. A power management system comprising:
a power management apparatus according to claim 1;
an inductor connected to the inductor connection of the power management apparatus;
a first energy store connected to the first energy storage element connection of the power management apparatus.

20. A method of controlling a power management apparatus, the power management apparatus comprising an inductor connection for connecting to an inductor, a plurality of energy harvesting input channels each for connecting to an electrical energy harvesting source, a first energy storage element connection for connecting to an energy storage element and a switching circuit, the method comprising:
operating the switching circuit to transfer energy between the energy harvesting input channels and the first energy storage element connection by a sequence of energy transfer cycles, each of the energy transfer cycles comprising:
an energise phase in which energy is transferred from one of the plurality of energy harvesting input channels to the inductor connection for an energise time (tE) to transfer energy to the inductor and;
a de-energise phase in which energy is transferred from the inductor connection to the first energy storage element connection for a de-energise time (tD),
wherein each energy harvesting input channel is allocated a plurality of the energy transfer cycles, with a harvesting cycle period (tP) between start times of successive energy transfer cycles, and the plurality of energy harvesting input channels are connected to the inductor connection in a time-multiplexed manner;
determining operating parameters for operating the switching circuit by:
determining, for each of the energy harvesting input channels, maximum power operating parameters which transfer a maximum power from the electrical energy harvesting source connected to the energy harvesting input channel and a maximum power inductor utilisation factor representing a portion of time for which the inductor is required by that input channel to transfer the maximum power;
determining a maximum inductor utilisation factor representing a total amount of time for which the inductor can be used to transfer energy between the energy harvesting input channels and the energy storage element;
determining a sum of the inductor utilisation factors for the plurality of energy harvesting input channels;
comparing the sum of the inductor utilisation factors with the maximum inductor utilisation factor; and
if the sum of the inductor utilisation factors is greater than the maximum inductor utilisation factor, determining a set of adjusted operating parameters for sharing use of the inductor between the plurality of energy harvesting input channels in the time-multiplexed manner, wherein at least one of the energy harvesting input channels is selected for an adjustment of the operating parameters from the maximum power operating parameters, the selection based on an effect of a change in the inductor utilisation factor and a corresponding change in power of the energy harvesting input channel, wherein the set of adjusted operating parameters (tE, tP) are determined such that a sum of adjusted inductor utilisation factors is less than the maximum inductor utilisation factor.

21. A method according to claim 20 wherein determining the set of adjusted operating parameters comprises:
determining an adjustment metric for each energy harvesting input channel to give a set of candidate adjustment metric values, where each adjustment metric value is indicative of a change in inductor utilisation factor and a corresponding change in power;
selecting one of the energy harvesting input channels for adjustment based on the set of candidate adjustment metric values; and
adjusting the operating parameters (tE, tP) for the selected energy harvesting input channel.

22. A method according to claim 21 wherein:
each candidate adjustment metric value is a ratio of a change in inductor utilisation factor to a change in power, and wherein selecting one of the energy harvesting input channels for adjustment comprises selecting the input channel associated with the adjustment metric having a largest value; or
each candidate adjustment metric value is a ratio of a change in power to a change in inductor utilisation factor, and wherein selecting one of the energy harvesting input channels for adjustment comprises selecting the energy harvesting input channel associated with the adjustment metric having a smallest value.

23. A method according to claim 20 wherein determining the set of operating parameters comprises:
determining a type of electrical energy harvesting source connected to each of the energy harvesting input channels; and
using the determined type of electrical energy harvesting source in determining the set of adjusted operating parameters.

24. A method according to claim 23 wherein the corresponding change in power is based on the determined type of electrical energy harvesting source.

25. A method according to claim 23 wherein a step size of the change in the inductor utilisation factor is based on the determined type of electrical energy harvesting source.

26. A method according to claim 20 wherein the operating parameters for each of the plurality of channels comprise an energise time (tE) and a harvesting cycle period (tP) and the method comprises determining the set of adjusted operating parameters by one of:
maintaining tE as a constant value and adjusting tP;
maintaining tP as a constant value and adjusting tE.

27. A method according to claim 20 comprising:
determining, for at least one of the input channels, a different value of at least one of the maximum power operating parameters to achieve a reduced inductor utilisation factor for that energy harvesting input channel before determining the set of adjusted operating parameters.

28. A method according to claim 20 comprising determining the set of adjusted operating parameters (tE, tP) for the switching circuit by an iterative process which uses an incremental change in inductor utilisation factor at each iteration.

29. A method according to claim 20 wherein the power management apparatus comprises a load output, the switching circuit is configured to selectively connect to the load output and the method comprises operating the switching circuit to transfer energy from the first energy storage element connection to the load output via the inductor connection.

30. A method according to claim 29 comprising determining the maximum inductor utilisation factor based on inductor time required to transfer energy from the energy storage element to the load output via the inductor connection.

31. A method according to claim 29 comprising operating the switching circuit to transfer energy from the first energy storage element connection to the load output by a plurality of transfer cycles, each transfer cycle comprising:
- an energise phase in which energy is transferred from the first energy storage element connection to the inductor connection for an energise time (tE) to transfer energy to the inductor and;
- a de-energise phase in which energy is transferred from the inductor connection to the load output for a de-energise time (tD).

32. A method according to claim 20 comprising, during operation with the set of adjusted operating parameters:
- determining if each of the energy harvesting input channels is operating substantially at a maximum power point; and
- if one or more of the energy harvesting input channels is no longer operating substantially at a maximum power point, determining new maximum power operating parameters for the one or more of the energy harvesting input channels.

33. A method according to claim 32 wherein, if one or more of the energy harvesting input channels is no longer operating substantially at a maximum power point, the method comprises determining a new set of adjusted operating parameters using the new maximum power operating parameters.

34. A method according to claim 20 comprising determining a further set of adjusted operating parameters based on at least one of:
- a change in state of an energy harvesting input channel;
- a voltage of the energy storage element;
- a change in voltage of the energy storage element since the determination of an existing set of adjusted operating parameters;
- a predetermined time period elapsing since the determination of a set of adjusted operating parameters;
- a start of a new period in which energy is not transferred to the load;
- a change in inductor usage requirements.

35. A computer program comprising instructions which, when the program is executed by a computer, cause the computer to carry out the method of claim 20.

36. A controller for a power management apparatus which is configured to perform the method of claim 20.

* * * * *